US012776114B2

(12) United States Patent
Yan et al.

(10) Patent No.: US 12,776,114 B2
(45) Date of Patent: Oct. 27, 2026

(54) INTERACTION DATA PROCESSING

(71) Applicant: Tencent Technology (Shenzhen) Company Limited, Shenzhen (CN)

(72) Inventors: Wei Yan, Shenzhen (CN); Liqiang Liu, Shenzhen (CN); Lingtao Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 196 days.

(21) Appl. No.: 18/586,108

(22) Filed: Feb. 23, 2024

(65) Prior Publication Data

US 2024/0203080 A1 Jun. 20, 2024

Related U.S. Application Data

(63) Continuation of application No. PCT/CN2023/088198, filed on Apr. 13, 2023.

(30) Foreign Application Priority Data

Aug. 17, 2022 (CN) ......................... 202210986428.2

(51) Int. Cl.
*G06T 19/20* (2011.01)
*G06T 3/40* (2006.01)
*G06V 10/74* (2022.01)

(52) U.S. Cl.
CPC ................ *G06T 19/20* (2013.01); *G06T 3/40* (2013.01); *G06V 10/761* (2022.01); *G06T 2219/2004* (2013.01)

(58) Field of Classification Search
CPC ... G06T 19/20; G06T 3/40; G06T 2219/2004; G06V 10/761
(Continued)

(56) References Cited

U.S. PATENT DOCUMENTS 8,407,592 B2 * 3/2013 Leahy .................. H04W 4/029 715/751
8,640,028 B2 * 1/2014 Leahy .................... A63F 13/30 715/756

(Continued)

FOREIGN PATENT DOCUMENTS

EP 3306444 A1 * 4/2018 ............... G06F 3/02

OTHER PUBLICATIONS

Blizzard Entertainment, World of Warcraftâ¢, Copyright © 2004-2005, 193 pages (Year: 2004) (Year: 2004).*

(Continued)

*Primary Examiner* — Thomas J Lett
(74) *Attorney, Agent, or Firm* — ARENTFOX SCHIFF LLP

(57) ABSTRACT

In an interaction data processing method, a first part of a virtual space is displayed on a first user interface. The virtual space includes a plurality of virtual objects that are displayed in the virtual space based on respective interaction states of the plurality of virtual objects. A first subset of the plurality of virtual objects in a grouped state are displayed as a group in the virtual space. A second subset of the plurality of virtual objects in an individual state are displayed individually in the virtual space. A virtual space browse operation is received. The display of the first part on the first user interface is changed to a second part of the virtual space based on the virtual space browse operation.

20 Claims, 17 Drawing Sheets

(58) Field of Classification Search
USPC .......................................................... 345/419
See application file for complete search history.

(56) References Cited

U.S. PATENT DOCUMENTS

| | | | | |
|---|---|---|---|---|
| 10,142,276 | B2 * | 11/2018 | Rapaport | G06Q 10/10 |
| 2019/0107990 | A1 * | 4/2019 | Spivack | G06T 11/60 |

OTHER PUBLICATIONS

"Jelly's Small Community is Really Happy", Available on Internet at: https://www.bilibili.com/video/BVJFF411E7zAJ?spm_id_from= 333.788.recommend_more video.5 &vd_source =56a7b7a746ff87f52b1be0ddb2d867fa, Feb. 17, 2022, 2 pages of Original Document Only.

International Search Report and Written Opinion received for PCT Patent Application No. PCT/CN2023/088198, mailed on Jun. 15, 2023, 12 pages (5 pages of English Translation and 7 pages of Original Document).

* cited by examiner

INTERACTION DATA PROCESSING

RELATED APPLICATIONS

The present application is a continuation of International Application No. PCT/CN2023/088198, filed on Apr. 13, 2023, which claims priority to Chinese Patent Application No. 202210986428.2, filed on Aug. 17, 2022. The entire disclosures of the prior applications are hereby incorporated by reference.

FIELD OF THE TECHNOLOGY

This application relates to the field of Internet technologies, including to an interaction data processing method and apparatus, an electronic device, a computer-readable storage medium, and a computer program product.

BACKGROUND OF THE DISCLOSURE

With development of science and technology, a user may control an avatar to interact with an avatar controlled by another user in a metaverse application. The metaverse is an virtual space running in parallel to the real world, and may be a virtual reality (VR) network world supported by a VR technology, a three-dimensional (3D) technology, and the like.

In the related art, online avatars may be displayed by using a virtual map. Due to a space limitation on a physical map, the online avatars may need to be partitioned. For example, conceptual units such as a server, a map, and a room are distinguished. However, in this partitioning method, a friendship chain of a user is not sufficiently directly displayed. For example, after a friend of the user goes online, the two need to enter a same map to meet each other. Consequently, efficiency of searching for a virtual object is low.

SUMMARY

Embodiments of this disclosure include an interaction data processing method and apparatus, an electronic device, a non-transitory computer-readable storage medium, and a computer program product. Embodiments of the present disclosure may be used to improve efficiency of searching for a virtual object.

Technical solutions in embodiments of this disclosure may be implemented as follows:

An embodiment of this disclosure provides an interaction data processing method. In an interaction data processing method, a first part of a virtual space is displayed on a first user interface. The virtual space includes a plurality of virtual objects that are displayed in the virtual space based on respective interaction states of the plurality of virtual objects. A first subset of the plurality of virtual objects in a grouped state are displayed as a group in the virtual space. A second subset of the plurality of virtual objects in an individual state are displayed individually in the virtual space. A virtual space browse operation is received. The display of the first part on the first user interface is changed to a second part of the virtual space based on the virtual space browse operation.

An embodiment of this disclosure provides an interaction data processing apparatus, including processing circuitry. The processing circuitry is configured to display a first part of a virtual space on a user interface. The virtual space includes a plurality of virtual objects. The plurality of virtual objects being is in the virtual space based on respective interaction states of the plurality of virtual objects. A first subset of the plurality of virtual objects in a grouped state is displayed as a group in the virtual space and a second subset of the plurality of virtual objects in an individual state is displayed individually in the virtual space. The processing circuitry is configured to receive a virtual space browse operation. The processing circuitry is configured to change the display of the first part on the first user interface to a second part of the virtual space based on the virtual space browse operation.

An embodiment of this disclosure provides an electronic device, including a memory and a processor. The memory is configured to store a computer program or executable instructions. The processor is configured to implement the interaction data processing method provided in the embodiments of this disclosure when executing the computer program or the executable instructions stored in the memory.

An embodiment of this disclosure provides a non-transitory computer-readable storage medium, storing instructions which when executed by a processor cause the processor to perform the interaction data processing method provided in the embodiments of this disclosure.

An embodiment of this disclosure provides a computer program product, including a computer program or executable instructions used for implementing the interaction data processing method provided in the embodiments of this disclosure when being executed by a processor.

Embodiments of this disclosure may include the following beneficial effect:

A real-time social status of a virtual object in a part of a region (namely, a first part) of a virtual space is displayed on a human-computer interaction interface in response to a virtual space login operation. Then the first part displayed on the human-computer interaction interface is switched to a second part in response to a virtual space browse operation. To be specific, a virtual object in another part (namely, a second part) of the virtual space may be displayed based on a browse operation. In this way, any virtual object in the virtual space can be easily found. This effectively improves efficiency of searching for a virtual object, and can provide reference for subsequently determining whether to initiate interaction.

DESCRIPTION OF EMBODIMENTS

Figure 1:
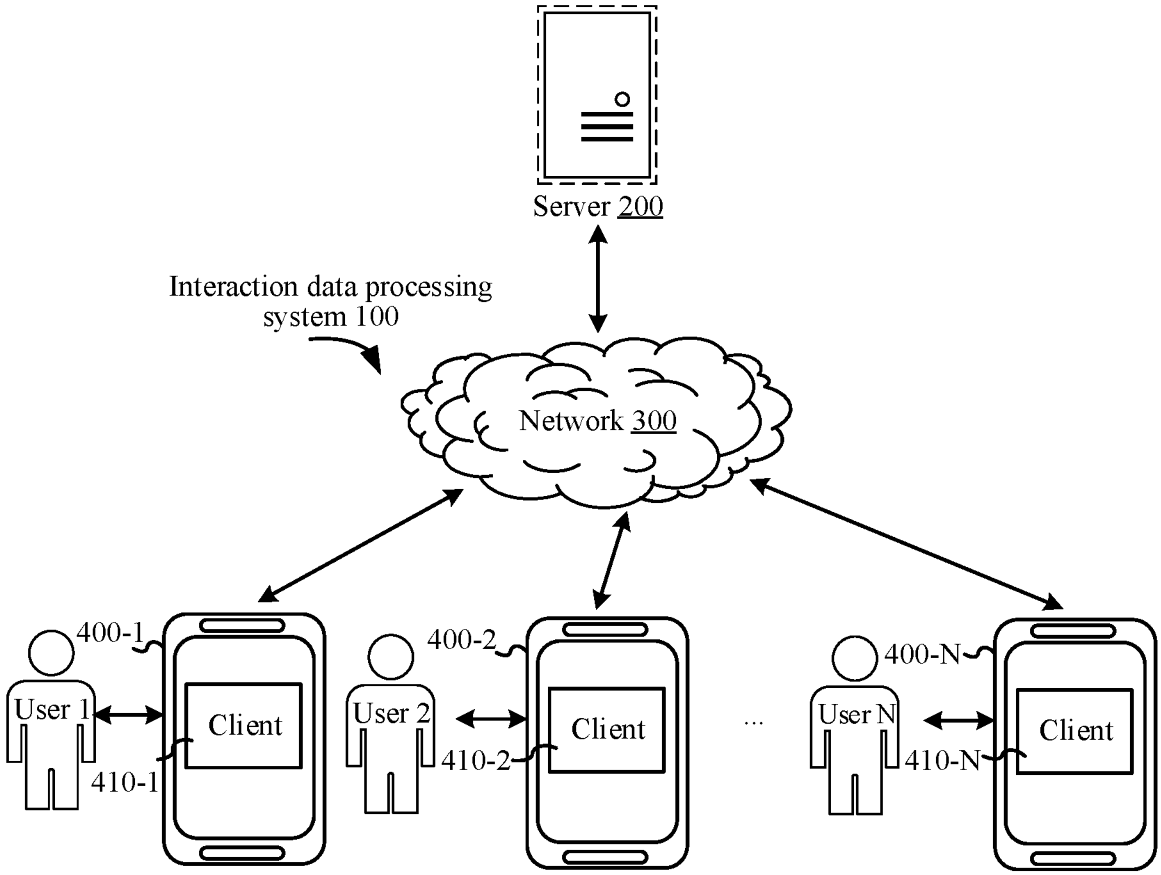
FIG. 1 is a schematic architectural diagram of an interaction data processing system 100 according to an embodiment of this disclosure.

To make the objectives, technical solutions, and advantages of this disclosure clearer, the following describes this disclosure in further detail with reference to the accompanying drawings. The described embodiments are not to be considered as a limitation to this disclosure. All other embodiments obtained by a person of ordinary skill in the art without creative efforts shall fall within the protection scope of this disclosure.

In the following descriptions, the term "some embodiments" describes subsets of all possible embodiments, but it can be understood that "some embodiments" may be the same subset or different subsets of all the possible embodiments, and can be combined with each other without conflict.

In the following descriptions, the terms "first" and "second" and the like are merely intended to distinguish between similar objects rather than describe a specific order of objects. It can be understood that the "first", the "second", and the like are interchangeable in order in proper circumstances, so that the embodiments of this disclosure described herein can be implemented in an order other than the order illustrated or described herein.

Unless otherwise defined, meanings of all technical and scientific terms used in this specification are the same as those usually understood by a person skilled in the art to which this disclosure belongs. The terms used in this specification are merely intended to describe the objectives of the embodiments of this disclosure, but are not intended to limit this disclosure.

Before the embodiments of this disclosure are further described in detail, examples of nouns and terms in the embodiments of this disclosure are described, and the following explanations are applicable to the nouns and terms in the embodiments of this disclosure.

(1) In response to: used for indicating a condition or a state on which an executed operation depends. In a case that a condition or a state on which one or more executed operations depend is met, the one or more operations may be performed in real time or with a specified delay. An execution order of a plurality of executed operations is not limited, unless otherwise stated.

(2) Virtual space is, for example, a space displayed (or provided) when an application runs on a terminal device, for example, the metaverse. The virtual space may be a simulated environment of the real world, a semi-simulated and semi-fictional virtual environment, or a purely fictional virtual environment. The virtual space may be any one of a two-dimensional virtual space, a 2.5-dimensional virtual space, or a three-dimensional virtual space. Dimensionality of the virtual space is not limited in the embodiments of this disclosure. For example, the virtual space may include the universe, sky, land, sea, and the like, and the land may include environmental elements such as desert and a city. A user may control movement of a virtual object in the virtual space.

(3) Virtual object is, for example, an image of any person or object that can perform interaction in a virtual space, or a movable object in a virtual space. The movable object may be a virtual character, a virtual animal, an animation character, or the like, for example, a character or an animal displayed in a virtual space. The virtual object may be a virtual avatar used for representing a user in the virtual space. The virtual space may include a plurality of virtual objects, and each virtual object has a shape and a volume in the virtual space, and occupies a part of the virtual space.

(4) Virtual reality (VR) is, for example, a simulation of a computer-generated environment (for example, a 3D environment). A user may interact with the simulation in a seemingly real or physical manner. The simulation may be a VR system of a single device or a group of devices. For example, the simulation may be generated on a VR helmet or some other display devices to perform display to a user. The simulation may include an image, a sound, a tactile feedback, and other sensations that simulate a real or fictional environment.

(5) Group is, for example, a combination of a plurality of virtual objects with same or similar features. A specific theme and a related organizational rule may be set for each group. For example, a plurality of virtual objects with same hobbies may be gathered to form a corresponding group.

(6) Solitary state is, for example, a state without interaction. To be specific, a virtual object in a solitary state does not join any group in a virtual space.

(7) Private message is, for example, a message transmitted in a one-to-one manner. The message is visible only to a sender (for example, a user 1 associated with a virtual object A) and a recipient (for example, a user 2 associated with a virtual object B), and is invisible to a third party (for example, a user 3 associated with a virtual object C). To be specific, a user may send a private message to another person in a case that the user wants to keep content of a chat with the another person private.

In the related art, in a social solution based on a virtual object in a virtual space (for example, the metaverse), walking and interaction are usually performed on a virtual map through remote sensing by simulating the physical world. However, the applicant finds that online virtual objects cannot all be displayed by using a virtual map. Due to a space limitation on a physical map, all the online virtual objects need to be partitioned (to be specific, divided into logical units). For example, logical units such as a server, a map, and a room are distinguished. In this partitioning method, a friendship chain of a user is not sufficiently directly displayed. For example, after a friend of the user goes online, the two need to enter a same map to meet each other. Consequently, efficiency of searching for a virtual object is low. In addition, the applicant further finds that efficiency of searching for people for social contact on a virtual map through remote sensing is low, because locations of people on the map are not distributed uniformly. In a case that a user cannot find people for social contact on a current map, the user needs to switch to another map. Consequently, efficiency of searching for a virtual object is further reduced.

In view of this, the embodiments of this disclosure provide an interaction data processing method and apparatus, an electronic device, a computer-readable storage medium, and a computer program product, to improve efficiency of searching for a virtual object. The following describes exemplary application of the electronic device provided in the embodiments of this disclosure. The electronic device provided in the embodiments of this disclosure may be implemented by a terminal device or jointly implemented by a terminal device and a server.

An example in which the interaction data processing method provided in the embodiments of this disclosure is jointly implemented by a terminal device and a server is used below for description.

FIG. 1 is a schematic architectural diagram of an interaction data processing system 100 according to an embodiment of this disclosure, to support an application for improving efficiency of searching for a virtual object. As shown in FIG. 1, the interaction data processing system 100 includes a server 200, a network 300, and N terminal devices (N being an integer greater than 2): a terminal device 400-1, a terminal device 400-2, . . . , and a terminal device 400-N. The terminal device 400-1 is a terminal device associated with a user 1. For example, the user 1 may log in to a client 410-1 running on the terminal device 400-1 by using an account 1, to control a first virtual object in a virtual space by using a human-computer interaction interface provided by the client 410-1. For ease of description, the human-computer interaction interface of the client 410-1 is referred to as a first human-computer interaction interface below. The terminal device 400-2 to the terminal device 400-N are terminal devices associated with a user 2 to a user N respectively. The user 2 to the user N may also log in, by using an account 2 to an account N respectively, to clients running on terminal devices respectively associated with the user 2 to the user N, to control a virtual object to interact with a virtual object controlled by another user.

The N terminal devices in FIG. 1 may be touchscreen devices or wearable VR devices. The terminal device 400-1 is used as an example. In a case that the terminal device 400-1 is a touchscreen device, a first part of the virtual space may be displayed on a touchscreen of the terminal device 400-1, and operations (for example, a zoom operation or a browse operation) in the following descriptions are implemented by various forms of touch operations (for example, a tap operation or a slide operation) on the touchscreen. In a case that the terminal device 400-1 is a wearable VR device, a user may perceive a first part of the virtual space that is projected by the wearable VR device, and implement operations in the following descriptions by using various forms of motion sensing or voice operations.

In some embodiments, the user 1 is used as an example. The server 200 may transmit, through the network 300, data of the virtual space to the terminal device 400-1 associated with the user 1. Then the client 410-1 (which may be, for example, a virtual space client, for example, a metaverse client) running on the terminal device 400-1 displays the first part of the virtual space on the first human-computer interaction interface (that is, the human-computer interaction interface of the client 410-1) based on the received data of the virtual space in response to a virtual space login operation triggered by the user 1 (for example, in a case that the client 410-1 receives an account and a password that are entered by the user 1 on a login interface), the virtual space including a plurality of groups and a plurality of virtual objects (for example, a virtual object B controlled by the user 2) in a solitary state. Then the client 410-1 switches the first part displayed on the first human-computer interaction interface to a second part of the virtual space in response to a virtual space browse operation triggered by the user 1, for example, in a case that the client 410-1 receives a slide operation triggered by the user 1 on the first human-computer interaction interface, the second part being at least partially different from the first part. In this way, switching to and display of a virtual object and a group in another part of the virtual space can be implemented through sliding on the human-computer interaction interface. In this way, any virtual object in the virtual space can be found through sliding. This improves efficiency of searching for a virtual object.

In some embodiments, a terminal device or a server may alternatively implement the interaction data processing method provided in the embodiments of this disclosure by running a computer program. For example, the computer program may be a native program or software module in an operating system; or may be a native application (APP), to be specific, a program that needs to be installed in an operating system to run, for example, a metaverse APP or an instant messaging APP (for example, the client 410-1); or may be a mini program, to be specific, a program that only needs to be downloaded to a browser environment to run; or may be a mini program that can be embedded in any APP. To sum up, the computer program may be an application, a module, or a plug-in in any form.

In some other embodiments, the embodiments of this disclosure may alternatively be implemented by using a cloud technology. The cloud technology is a hosting technology that integrates a series of resources such as hardware, software, and network resources in a wide area network or a local area network to implement data computing, storage, processing, and sharing.

The cloud technology is a general term for a network technology, an information technology, an integration technology, a management platform technology, an application technology, and the like that are based on application of a cloud computing business model, and may constitute a resource pool for use on demand and therefore is flexible and convenient. A cloud computing technology is to become an important support. A background service of a technology network system requires a large number of computing and storage resources.

For example, the server 200 in FIG. 1 may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal device (for example, the terminal device 400-1 to the terminal device 400-N) may be a smartphone, a tablet computer, a notebook computer, a desktop computer, a smart speaker, a smartwatch, a vehicle-mounted terminal, or the like, but is not limited thereto. The terminal device and the server may be directly or indirectly connected through wired or wireless communication. This is not limited in the embodiments of this disclosure.

Figure 2:
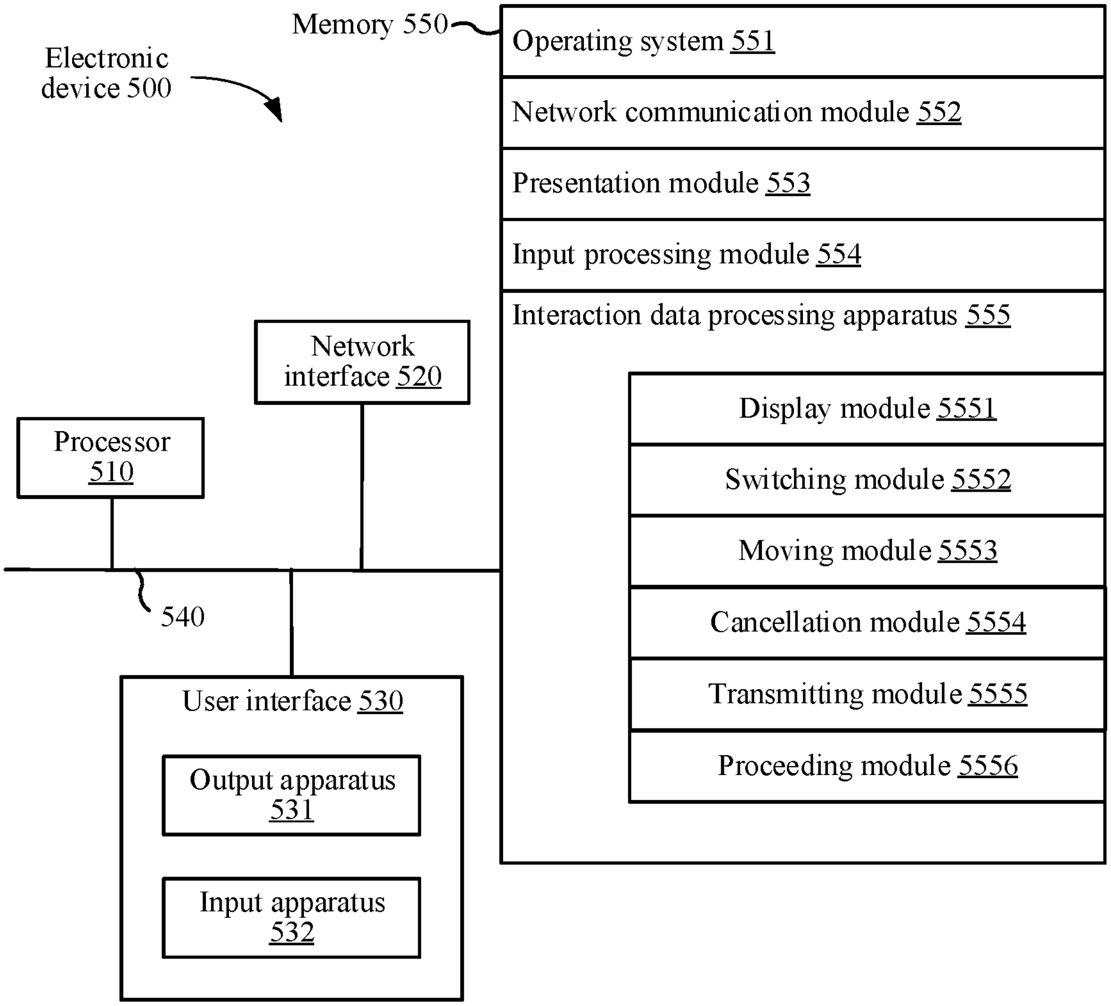
FIG. 2 is a schematic structural diagram of an electronic device 500 according to an embodiment of this disclosure.

The following further describes a structure of the electronic device provided in the embodiments of this disclosure. For example, the electronic device is a terminal device. FIG. 2 is a schematic structural diagram of an electronic device 500 according to an embodiment of this disclosure. The electronic device 500 shown in FIG. 2 includes at least one processor 510, a memory 550, at least one network interface 520, and a user interface 530. The components in the electronic device 500 are coupled together through a bus system 540. It can be understood that the bus system 540 is configured to implement connection and communication between the components. In addition to a data bus, the bus system 540 further includes a power bus, a control bus, and a state signal bus. However, for ease of clear description, all types of buses in FIG. 2 are marked as the bus system 540.

The processor 510 may be an integrated circuit chip with a signal processing capability, for example, a general-purpose processor, a digital signal processor (DSP), another programmable logic device, a discrete gate or transistor logic device, or a discrete hardware component. The general-purpose processor may be a microprocessor, any conventional processor, or the like.

The user interface 530 includes one or more output apparatuses 531 capable of presenting media content, including one or more speakers and/or one or more visual display screens. The user interface 530 further includes one or more input apparatuses 532, including user interface components for facilitating user input, for example, a keyboard, a mouse, a microphone, a touch display screen, a camera, or another input button or control.

The memory 550 may be a removable memory, a non-removable memory, or a combination thereof. Exemplary hardware devices include a solid-state memory, a hard disk drive, an optical disc drive, and the like. In some embodiments, the memory 550 includes one or more storage devices physically located away from the processor 510.

The memory 550 includes a volatile memory or a non-volatile memory, or may include both a volatile memory and a non-volatile memory. The non-volatile memory may be a read-only memory (ROM). The volatile memory may be a random access memory (RAM). The memory 550 described in this embodiment of this disclosure is intended to include any suitable type of memory.

In some embodiments, the memory 550 is capable of storing data to support various operations. Examples of the data include a program, a module, and a data structure or a subset or superset thereof. Examples are described below:

an operating system 551, including system programs for processing various basic system services and performing hardware-related tasks, for example, a framework layer, a core library layer, and a driver layer for implementing various basic services and processing hardware-based tasks;

a network communication module 552, configured to reach another computing device through one or more (wired or wireless) network interfaces 520, exemplary network interfaces 520 including Bluetooth, wireless fidelity (Wi-Fi), universal serial bus (USB), and the like;

a presentation module 553, configured to present information by using one or more output apparatuses 531 (for example, a display screen or a speaker) associated with the user interface 530 (for example, a user interface for operating a peripheral device and displaying content and information); and an input processing module 554, configured to detect one or more user inputs or interactions that come from one or more input apparatuses 532 and translate the detected inputs or interactions.

In some embodiments, the apparatus provided in the embodiments of this disclosure may be implemented by using software. FIG. 2 shows an interaction data processing apparatus 555 stored in the memory 550. The interaction data processing apparatus may be software in a form of a program or plug-in, and includes the following software modules: a display module 5551, a switching module 5552, a moving module 5553, a cancellation module 5554, a transmitting module 5555, and a proceeding module 5556. These modules are logical modules, and therefore may be flexibly combined or further split based on implemented functions. For ease of description, FIG. 2 shows all the foregoing modules. However, this is not to be regarded as excluding an implementation in which the interaction data processing apparatus 555 includes only the display module 5551 and the switching module 5552. Functions of the modules are described below.

The interaction data processing method provided in the embodiments of this disclosure are specifically described below with reference to exemplary application and implementation of a terminal device provided in the embodiments of this disclosure.

Figure 3:
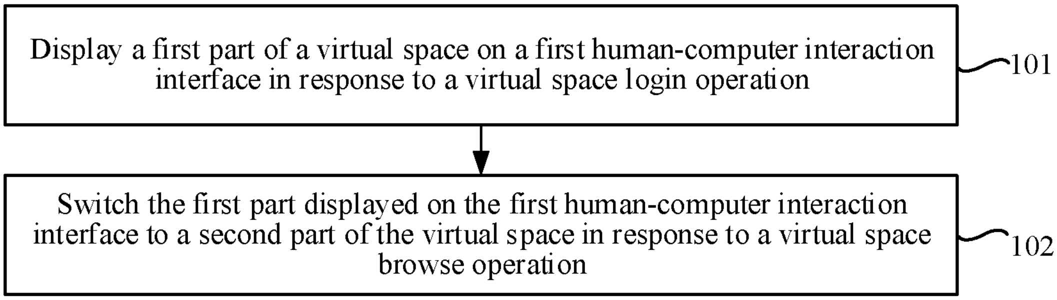
FIG. 3 is a schematic flowchart of an interaction data processing method according to an embodiment of this disclosure.

FIG. 3 is a schematic flowchart of an interaction data processing method according to an embodiment of this disclosure. The method is described with reference to steps shown in FIG. 3.

The method shown in FIG. 3 may be performed by various forms of computer programs running on a terminal device. The computer program is not limited to a client, and for example, may alternatively be an operating system, a software module, a script, or a mini program in the foregoing descriptions. Therefore, a client used as an example below is not to be construed as a limitation on the embodiments of this disclosure. In addition, for ease of description, the following does not specifically distinguish between a terminal device and a client running on a terminal device.

In step 101, a first part of a virtual space is displayed on a first human-computer interaction interface in response to a virtual space login operation. In an example, a first part of a virtual space is displayed on a first user interface. The virtual space includes a plurality of virtual objects that are displayed in the virtual space based on respective interaction states of the plurality of virtual objects. A first subset of the plurality of virtual objects in a grouped state are displayed as a group in the virtual space. A second subset of the plurality of virtual objects in an individual state are displayed individually in the virtual space.

Herein, the virtual space includes a plurality of groups and a plurality of virtual objects in a solitary state (to be specific, without interaction). The plurality of virtual objects may include only a virtual object in an online state, or may include both a virtual object in an online state and a virtual object in an offline state. In the latter case, different display parameters may be used for distinguishing between the virtual objects. For example, the virtual object in the online state may be displayed in color, and the virtual object in the offline state may be displayed in gray.

In some embodiments, a virtual object in a group and a virtual object in a solitary state may be displayed in a full-body, half-body, or avatar mode. For example, in a VR scene, a virtual object in a group and a virtual object in a solitary state may be displayed in a half-body mode. For example, in a first-person mode in the VR scene, only a body part of a virtual object that can be seen by eyes of a user 1 may be displayed on the first human-computer interaction interface. For example, only arms, legs, feet, a chest, and an abdomen of the virtual object may be displayed.

In some other embodiments, a virtual object may alternatively be located in a virtual channel (for example, a circle, used for changing a location in the virtual space). For example, in a case that a virtual object is located in a virtual channel alone, it indicates that the virtual object is in a solitary state; or in a case that a plurality of virtual objects are located in a same virtual channel, it indicates that the plurality of virtual objects constitute a group. The plurality of virtual objects in the group may be in an interactive state. For example, the plurality of virtual objects gather together for a chat, a meeting, or the like. Alternatively, the plurality of virtual objects may not in an interactive state. For example, the plurality of virtual objects watch a movie or listen to music together.

In some embodiments, the plurality of virtual objects may include a first virtual object and at least one second virtual object. The first virtual object is a virtual object (for example, a virtual object A controlled by the user 1) able to be controlled on the first human-computer interaction interface. The second virtual object is any one of the plurality of virtual objects other than the first virtual object. In this case, a terminal device (for example, a terminal device associated with the user 1) may display the first part of the virtual space on the first human-computer interaction interface in the following manner: The first virtual object is displayed on the first human-computer interaction interface, for example, the first virtual object may be displayed at a center location on the first human-computer interaction interface or at any other non-edge location, to be specific, the first virtual object is displayed on a first screen by default when the user 1 logs in to the virtual space. At least one of the second virtual object and the group is displayed.

Figure 4A:
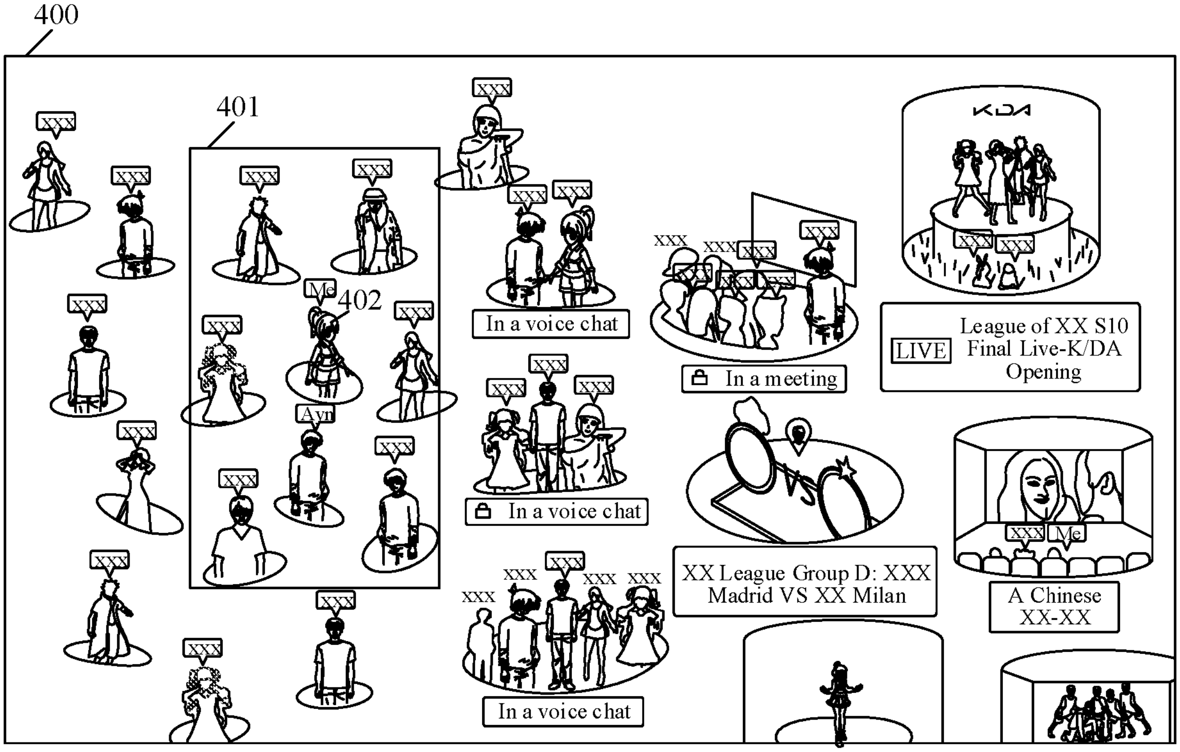
FIG. 4A to FIG. 4Q are schematic diagrams of application scenarios of an interaction data processing method according to an embodiment of this disclosure.

For example, FIG. 4A is a schematic diagram of an application scenario of an interaction data processing method according to an embodiment of this disclosure. As shown in FIG. 4A, a virtual space 400 includes a plurality of virtual objects in a solitary state and a plurality of groups. The terminal device (for example, the terminal device associated with the user 1) displays a first part 401 of the virtual space 400 (to be specific, a part of the virtual space that can be seen by the user 1 when the user 1 logs in to a virtual space client) on the first human-computer interaction interface in response to a virtual space login operation triggered by the user 1. The first part 401 includes a first virtual object 402 (for example, the virtual object A controlled by the user 1) and another virtual object that has a social relationship with the first virtual object 402.

In some embodiments, distribution of locations of the plurality of virtual objects and the plurality of groups in the virtual space may be determined based on a social relationship with the first virtual object.

For example, the first virtual object is the virtual object A controlled by the user 1. The terminal device (to be specific, the terminal device associated with the user 1) may display the first virtual object on the first human-computer interaction interface and display at least one of the second virtual object and the group in the following manner: The virtual object A is displayed in a first object region (to be specific, a region of friends) of the virtual space, where the first object region includes a second virtual object that has a social relationship with the virtual object A, for example, a virtual object controlled by another account that has a friendship with the account 1 registered by the user 1, for example, a virtual object B controlled by a user 2 and a virtual object C controlled by a user 3, and the user 1, the user 2, and the user 3 are friends. A second object region (to be specific, a region of possible acquaintances) and a third object region (to be specific, a region of strangers) are displayed in a near-to-far order in a first direction of the first object region (for example, on the left of or above the first object region), where the second object region includes a second virtual object recommended for the virtual object A to interact with, for example, a virtual object D controlled by a user 4, the user 4 is a possible acquaintance of the user 1, the third object region includes a second virtual object that does not have a social relationship with the virtual object A, for example, a virtual object E controlled by a user 5, and the user 1 and the user 5 are strangers of each other. A first group region (to be specific, a region of groups that a friend joins), a second group region (to be specific, a region of groups of possible interest), and a third group region (to be specific, a region of groups of strangers) are displayed in a near-to-far order in a second direction of the first object region (for example, on the right of or below the first object region), where the first group region includes a group that a second virtual object having a social relationship with the first virtual object joins, the second group region includes a group recommended for the virtual object A to join, and the third group region includes a group that the virtual object A does not join.

Figure 5:
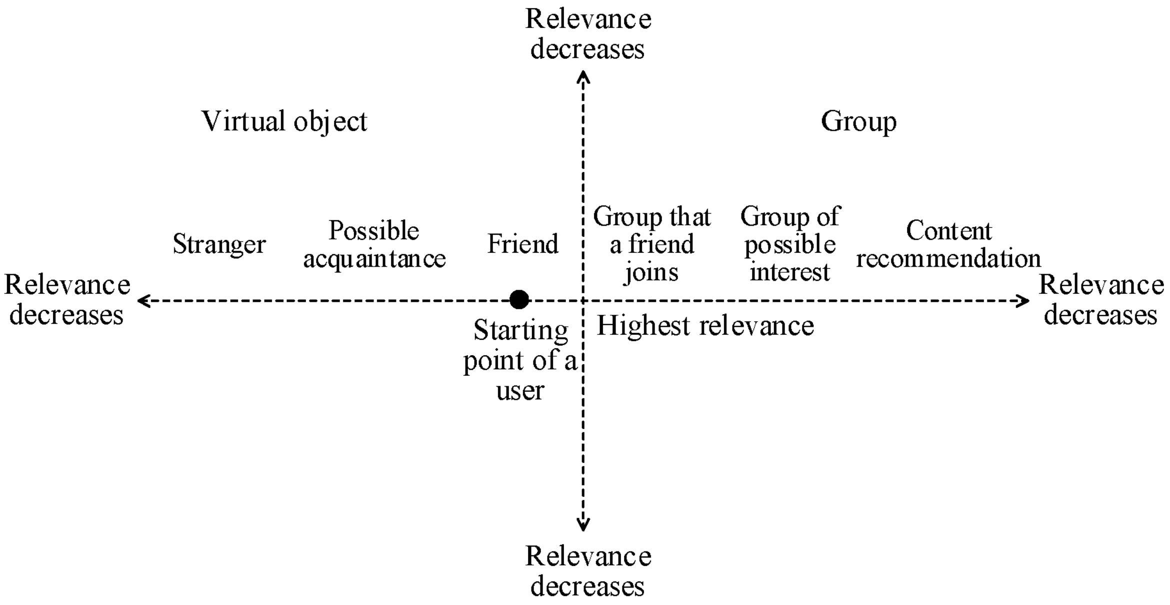
FIG. 5 is a schematic diagram of distribution of locations of a virtual object and a group in a virtual space according to an embodiment of this disclosure.

For example, FIG. 5 is a schematic diagram of distribution of locations of a virtual object and a group in a virtual space according to an embodiment of this disclosure. As shown in FIG. 5, when a user logs in to the virtual space, a virtual object corresponding to the user appears in the region of friends in the virtual space. In addition, the region of possible acquaintances and the region of strangers are displayed in a near-to-far order on the left of the region of friends, and the region of groups that a friend joins, the region of groups of possible interest, and a region of groups for content recommendation are displayed in a near-to-far order on the right of the region of friends. In this way, virtual objects and groups in the virtual space are displayed in a partitioned manner. This facilitates searching by a user and improves efficiency of searching for a virtual object by a user.

The foregoing manner of determining the distribution of the locations of the plurality of virtual objects and the plurality of groups in the virtual space based on the social relationship with the first virtual object is only a possible example. The distribution of the locations of the plurality of virtual objects and the plurality of groups in the virtual space may alternatively be determined based on another factor (for example, an interest/preference or social contact frequency). For example, in a case that only the interest/preference is considered, three (or more) regions of different degrees may be divided in a near-to-far order based on relevance of interests/preferences. For example, a distance from the first virtual object may be further determined based on cumulative online duration, the number of followers, interaction popularity, or the like. For example, higher interaction popularity indicates a shorter distance from the first virtual object. Certainly, the distribution of the locations of the plurality of virtual objects and the plurality of groups in the virtual space may alternatively be determined by considering all of the foregoing three factors. This is not specifically limited in this embodiment of this disclosure. To be specific, in this embodiment of this disclosure, relevance is calculated based on a friendship, an interest/preference, or the like of a user, and with the user as a center, a virtual object and a group of another user highly relevant to the user are displayed around a virtual object of the user. Most virtual objects that interact with each other are highly relevant. Therefore, efficiency of searching for a virtual object can be greatly improved in this arrangement mode.

For example, a distance between the first virtual object and the second virtual object may be negatively correlated with the following parameter: a similarity between the first virtual object and the second virtual object, the similarity being determined based on at least one of the following information of the first virtual object and the second virtual object: a social relationship (for example, whether to follow or add a friend), an interest/preference, and social contact frequency (for example, the number of reposts, comments, or likes); and a distance between the first virtual object and the group may be negatively correlated with the following parameter: a similarity between the first virtual object and the group, the similarity being determined based on at least one of the following information of the first virtual object and the group: a social relationship (for example, whether the group includes a virtual object that has a social relationship with the first virtual object), an interest/preference (for example, whether the group includes a virtual object that has the same interest as the first virtual object), and social contact frequency (for example, the number of reposts, comments, and likes by a virtual object in the group for information posted by the first virtual object).

In some other embodiments, in the virtual space, distribution density of the plurality of virtual objects and the plurality of groups may be greater than a distribution density threshold. For example, at least six virtual objects or groups are displayed on each screen. At the same resolution, the number of virtual objects or groups displayed on each screen may be positively correlated with a size of the first human-computer interaction interface (for example, a length of a diagonal line). For example, six virtual objects or groups are displayed on each screen on a mobile phone with a size of six inches, and 15 virtual objects or groups are displayed on each screen on a notebook computer with a size of 20 inches. In addition, a distribution spacing is less than a distribution spacing threshold. For example, the plurality of virtual objects and the plurality of groups may be distributed in the virtual space at equal spacings; or a variance of the distribution spacing is less than a variance threshold, to be specific, although the plurality of virtual objects or the plurality of groups are not distributed at equal spacings, a variation from a mean is less than a variation threshold. In this way, all virtual objects and groups in the virtual space are distributed and displayed at appropriate spacings. This can further improve efficiency of searching for a virtual object in the virtual space by a user.

For example, the distribution spacing may be the following distance: a distance between a virtual object in a solitary state and another virtual object in a solitary state, or a distance between a virtual object in a solitary state and an adjacent group.

In step 102, the first part displayed on the first human-computer interaction interface is switched to a second part of the virtual space in response to a virtual space browse operation. In an example, a virtual space browse operation is received. The display of the first part on the first user interface is changed to a second part of the virtual space based on the virtual space browse operation.

Figure 4B:
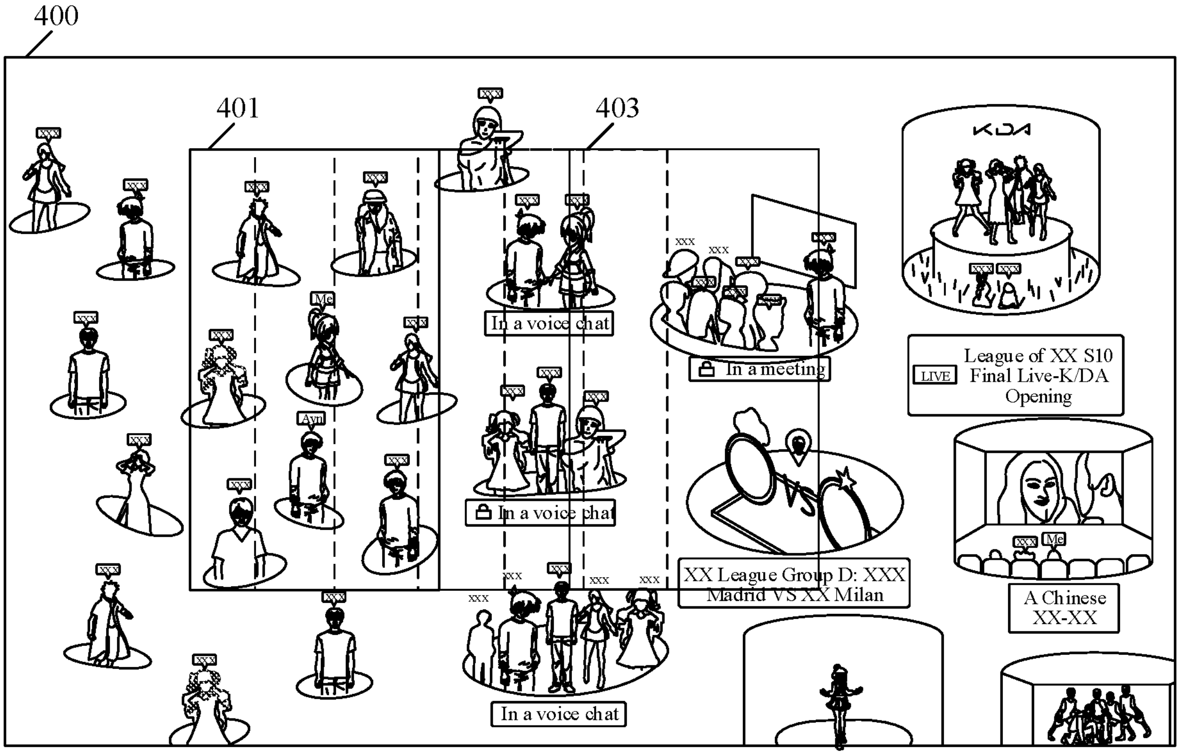

Herein, the second part is at least partially different from the first part. For example, the first part and the second part may be completely non-overlapping. For example, as shown in FIG. 4B, the first part 401 and a second part 403 are two completely non-overlapping parts in the virtual space 400. Certainly, the first part and the second part may alternatively be partially overlapping. This is not specifically limited in this embodiment of this disclosure.

In some embodiments, in a case that the terminal device is a touchscreen device, the virtual space browse operation may be a slide operation on the first human-computer interaction interface. For example, in a display scenario of an intelligent terminal such as a personal computer or a mobile phone, a user may switch the first part displayed on the first human-computer interaction interface to the second part of the virtual space by using a slide operation on the first human-computer interaction interface. Certainly, the virtual space browse operation may alternatively be a motion sensing operation. For example, in a case that the terminal device is a wearable VR device, the first human-computer interaction interface is formed through projection on the wearable device. Therefore, a user may switch the first part displayed on the first human-computer interaction interface to the second part of the virtual space by using a motion sensing operation, for example, waving an arm or shaking the head. A distribution direction of the second part relative to the first part is consistent with a direction of the motion sensing operation. For example, in a case that the user shakes the head to the left, the first part displayed on the human-computer interaction interface may be switched to a second part on the left of the first part in the virtual space. In addition, a distance between a center of the second part and a center of the first part is consistent with a distance of the motion sensing operation. For example, a larger range of waving the arm by the user indicates a greater distance between the center of the second part and the center of the first part.

For example, the virtual space browse operation is a slide operation on the first human-computer interaction interface. The terminal device may implement step 102 in the following manner: switching the first part displayed on the first human-computer interaction interface to the second part of the virtual space in response to the slide operation based on a sliding direction and a sliding distance of the slide operation. A distribution direction of the second part relative to the first part is consistent with the sliding direction. A distance between a center of the second part and a center of the first part is consistent with the sliding distance. To be specific, a greater sliding distance indicates a greater distance between the center of the second part and the center of the first part.

The foregoing switching process may be a real-time response process. To be specific, when detecting a slide operation triggered by a user, the terminal device performs real-time switching based on a sliding distance and a sliding direction that correspond to the slide operation, for example, gradually switches from the first part to the second part along with the slide operation triggered by the user.

For example, FIG. 4B is a schematic diagram of an application scenario of an interaction data processing method according to an embodiment of this disclosure. As shown in FIG. 4B, the first part 401 of the virtual space 400 is displayed on the first human-computer interaction interface. Then the terminal device may gradually switch the first part 401 displayed on the first human-computer interaction interface to the second part 403 on the right of the first part 401 in the virtual space 400 in response to a slide operation performed by a user on the first human-computer interaction interface (for example, in a case that the user slides a screen to the right). A dashed-line box shown in FIG. 4B represents a part of the virtual space 400 that is displayed on the first human-computer interaction interface during the switching from the first part 401 to the second part 403, that is, a part between the first part 401 and the second part 403.

In some other embodiments, a browse control including an up direction, a down direction, a left direction, and a right direction may be set on the first human-computer interaction interface, and a user may tap any direction of the browse control to switch a part of the virtual space that is displayed on the first human-computer interaction interface. For example, in a case that a tap operation performed by the user on the up-direction branch of the browse control is received, the first part displayed on the first human-computer interaction interface may be switched to a second part above the first part in the virtual space. A distance between a center of the second part and a center of the first part may be consistent with a length or a width of the first human-computer interaction interface. For example, in a case that the first part is displayed on the first human-computer interaction interface in a landscape mode, the distance between the center of the second part and the center of the first part may be consistent with the width of the first human-computer interaction interface; or in a case that the first part is displayed on the first human-computer interaction interface in a portrait mode, the distance between the center of the second part and the center of the first part may be consistent with the length of the first human-computer interaction interface. To be specific, the foregoing solution is a page flip process, and the terminal device directly switches from the first part to the second part when detecting the tap operation performed by the user on the browse control, without displaying content between the first part and the second part on the first human-computer interaction interface.

In the foregoing solution, that the distance between the center of the second part and the center of the first part is consistent with the length or the width of the first human-computer interaction interface is only a possible example, and the distance may alternatively be another value, for example, half of or twice the length of the first human-computer interaction interface. Certainly, a distance of movement during each time of page flipping may alternatively be set by a user. This is not specifically limited in this embodiment of this disclosure.

Figure 4C:
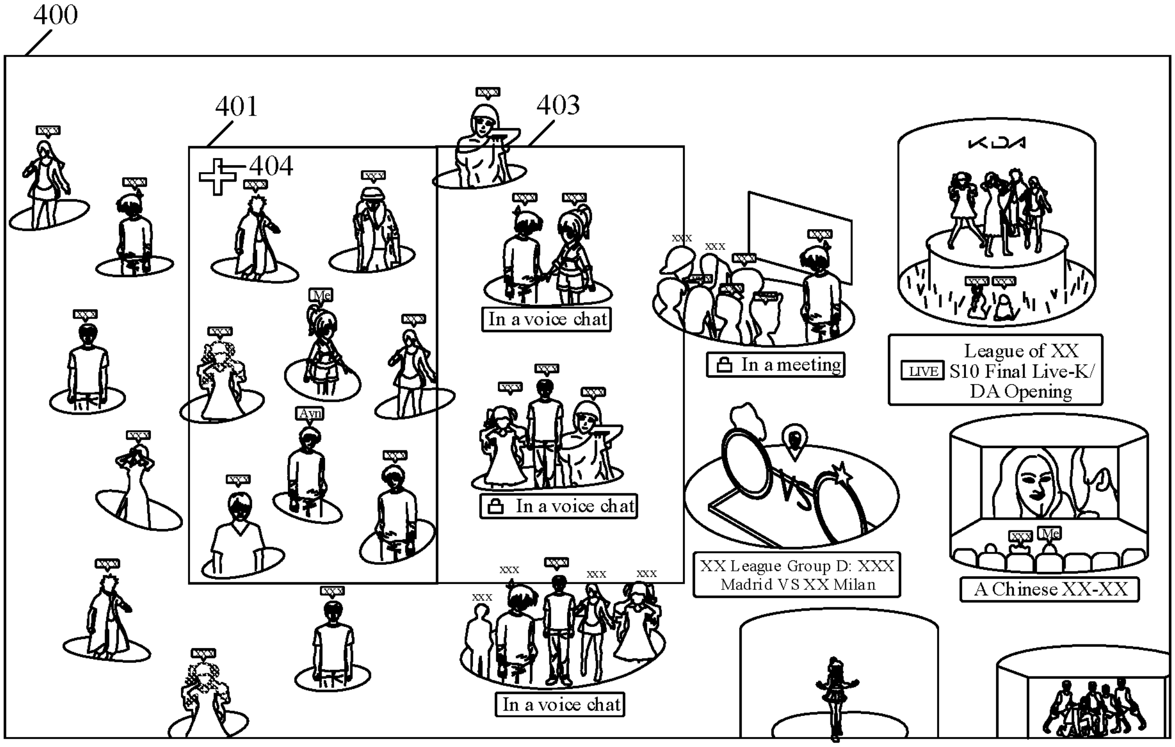

For example, FIG. 4C is a schematic diagram of an application scenario of an interaction data processing method according to an embodiment of this disclosure. As shown in FIG. 4C, the first part 401 of the virtual space 400 is displayed on the first human-computer interaction interface, and a browse control 404 including an up direction, a down direction, a left direction, and a right direction is further displayed in the first part 401. In a case that a tap operation performed by a user on the right-direction branch of the browse control 404 is received, the first part 401 displayed on the first human-computer interaction interface may be directly switched to the second part 403 of the virtual space 400 (this is equivalent to flipping a page to the right).

In some other embodiments, the terminal device may further perform the following processing: displaying a third part of the virtual space in response to a zoom operation for the first part, the third part being determined by zooming in or zooming out the first part based on a zoom ratio corresponding to the zoom operation. For example, a zoom-out operation may be performed, so that more virtual objects in the virtual space can be displayed on each screen of the first human-computer interaction interface. For example, it is assumed that only six virtual objects can be displayed on each screen before the zoom-out operation is performed. After the zoom-out operation is performed, a size of a virtual object displayed on the human-computer interaction interface is reduced, and therefore 15 virtual objects can be displayed on each screen. This can further improve efficiency of searching for a virtual object.

A form of the zoom operation may be a multi-finger pinch gesture or a multi-finger stretch gesture. For example, a form of a zoom-out operation may be a multi-finger pinch gesture, and a form of a zoom-in operation may be a multi-finger stretch gesture. Certainly, a form of the zoom operation may alternatively be a motion sensing action. For example, the zoom ratio corresponding to the zoom operation may be determined based on a parameter (for example, a moving distance) of a motion sensing operation, or zooming at a specified ratio may be performed based on each operation.

Figure 6A:
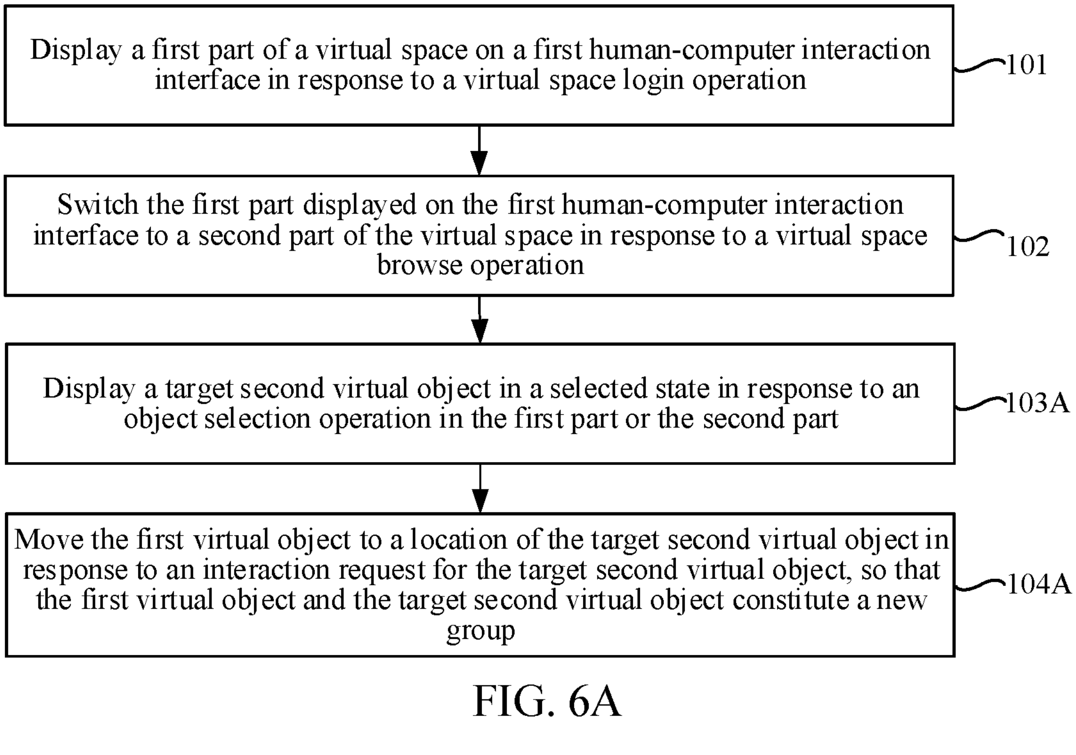
FIG. 6A and FIG. 6B are schematic flowcharts of an interaction data processing method according to an embodiment of this disclosure.

In some embodiments, the plurality of virtual objects may include a first virtual object and at least one second virtual object, the first virtual object is a virtual object able to be controlled on the first human-computer interaction interface, and the second virtual object is any one of the plurality of virtual objects other than the first virtual object. In this case, the terminal device may further perform step 103A to step 104A shown in FIG. 6A after completing step 102 shown in FIG. 3. This is described with reference to steps shown in FIG. 6A.

In step 103A, a target second virtual object in a selected state is displayed in response to an object selection operation in the first part or the second part.

Herein, the target second virtual object is a second virtual object selected by the object selection operation in the first part or the second part.

In some embodiments, for example, the first virtual object is the virtual object A controlled by the user 1. The terminal device (for example, the terminal device associated with the user 1) may display the target second virtual object (for example, the virtual object B controlled by the user 2, where the virtual object B may be zoomed in to represent that the virtual object B is currently in a selected state) in the selected state (for example, a focused state) and a corresponding call control (for example, at least one of a voice call control and a video call control) in response to an object selection operation performed by the user 1 in the first part or the second part. In addition, in a case that the target second virtual object is in the selected state, at least one of a data view control and a message control (for example, greeting) may alternatively be displayed for the target second virtual object. The two controls do not trigger movement of a location of the first virtual object. For example, in a case that a trigger operation on the data view control is received, detailed information of the target second virtual object may be displayed on the first human-computer interaction interface. In a case that a trigger operation on the message control is received, a message may be transmitted to the target second virtual object. For example, an emoticon or a greeting is transmitted.

For example, the object selection operation in the first part means that a virtual object that needs to perform interaction is selected on the first screen (namely, the first part) in a case that the user 1 does not slide the screen. To be specific, both the first virtual object and the target second virtual object may be located in the first part.

For example, the object selection operation in the second part means that a virtual object that needs to perform interaction selected on a second screen (namely, the second part) in a case that the user 1 slides the screen. To be specific, the first virtual object is located in the first part, the target second virtual object may be located in the second part, and the first part and the second part have no intersection.

In some other embodiments, the terminal device may display the target second virtual object in the selected state in following manner: displaying the target second virtual object in the selected state in a zoom-in mode. In addition, the terminal device may cancel the zoom-in mode of the target second virtual object after the first virtual object and the target second virtual object constitute a new group.

In step 104A, the first virtual object is moved to a location of the target second virtual object in response to an interaction request for the target second virtual object, so that the first virtual object and the target second virtual object constitute a new group.

Herein, the new group is different from the original plurality of groups in the virtual space.

In some embodiments, still, for example, the first virtual object is the virtual object A controlled by the user 1, and the target second virtual object is the virtual object B controlled by the user 2. After receiving an interaction request for the virtual object B, for example, receiving a trigger operation performed by the user 1 on a call control corresponding to the virtual object B, the terminal device (for example, the terminal device associated with the user 1) moves the virtual object A to a location of the virtual object B, so that the virtual object A and the virtual object B constitute a new group different from the plurality of groups.

After the virtual object B receives the interaction request transmitted by the virtual object A, corresponding notification information may be displayed on a second human-computer interaction interface for controlling the virtual object B. After the terminal device associated with the user 1 receives a confirmation notification transmitted by a terminal device associated with the user 2, for example, after the terminal device associated with the user 2 receives a confirmation operation performed by the virtual object B on the notification information and transmits the confirmation notification to the terminal device associated with the user 1, the terminal device associated with the user 1 moves the virtual object A to the location of the virtual object B, so that the virtual object A and the virtual object B constitute a new group.

In some other embodiments, the first virtual object and the target second virtual object each may be located in a virtual channel (for example, a circle). In this case, the terminal device may move the first virtual object to the location of the target second virtual object in the following manner, so that the first virtual object and the target second virtual object constitute a new group: displaying disappearance of the first virtual object from a virtual channel in which the first virtual object is currently located, and appearance of the first virtual object in a virtual channel in which the target second virtual object is located, so that the first virtual object and the target second virtual object constitute a new group.

In some embodiments, in a case that the plurality of virtual objects and the plurality of groups are distributed in different regions in the virtual space, the terminal device may further perform the following processing after moving the first virtual object to the location of the target second virtual object so that the first virtual object and target second virtual object constitute a new group: moving the new group to a junction between a region in which the plurality of virtual objects are distributed and a region in which the plurality of groups are distributed, to display the new group at the junction; or moving the new group to a region in which the plurality of groups are distributed, to display the new group in the region in which the plurality of groups are distributed. This prevents the group from appearing in the region in which the plurality of virtual objects are distributed, and improves efficiency of searching for a virtual object by a user.

For example, the terminal device may move the new group to the junction between the region in which the plurality of virtual objects are distributed and the region in which the plurality of groups are distributed or to the region in which the plurality of groups are distributed in the following manner: keeping a display location of the new group on the first human-computer interaction interface unchanged, and moving, relative to the new group, a virtual object and a group on the first human-computer interaction interface other than the new group, so that the new group is located at the junction between the region in which the plurality of virtual objects are distributed and the region in which the plurality of groups are distributed, or is located in the region in which the plurality of groups are distributed.

An example in which both the first virtual object and the target second virtual object are located in the first part of the virtual space is used below for description.

Figure 4D:
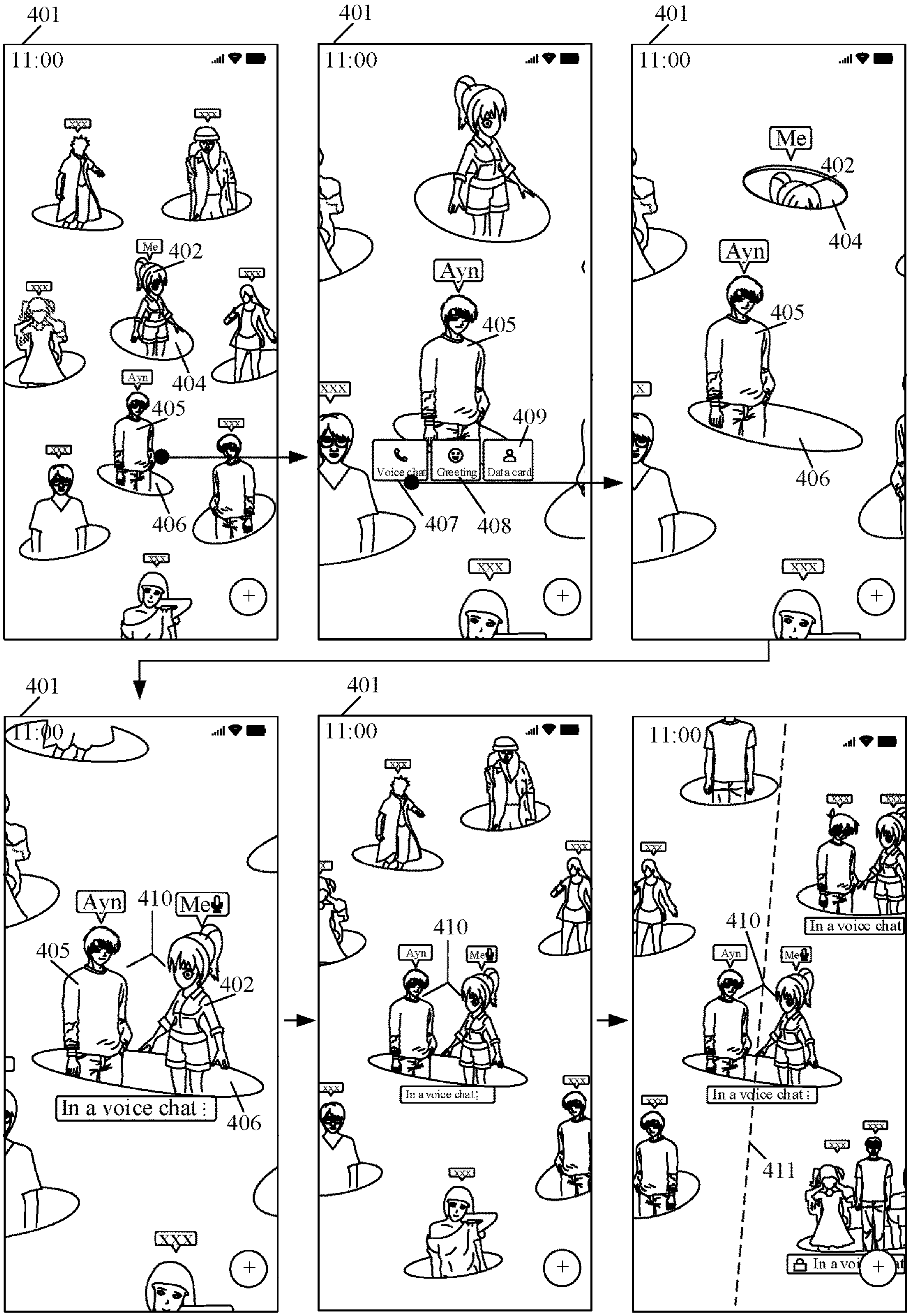

For example, FIG. 4D is a schematic diagram of an application scenario of an interaction data processing method according to an embodiment of this disclosure. As shown in FIG. 4D, the first part 401 of the virtual space is displayed on the first human-computer interaction interface, the first virtual object 402 (for example, the virtual object A controlled by the user 1) is displayed in the first part 401, and the first virtual object 402 is located in a virtual channel 404. Then the terminal device (for example, the terminal device associated with the user 1) displays a target second virtual object 405 (for example, the virtual object B controlled by the user 2) in a selected state (for example, a focused state) when receiving a selection operation performed by the user 1 on the target second virtual object 405 displayed in the first part 401, for example, may display the target second virtual object 405 in the selected state and a corresponding Voice chat control 407, Greeting control 408, and Data card control 409 in a zoom-in mode. Then disappearance of the first virtual object 402 from the virtual channel 404 and appearance of the first virtual object 402 in a virtual channel 406 in which the target second virtual object 405 is located are displayed in a case that a tap operation performed by the user 1 on the Voice chat control 407 is received, so that the first virtual object 402 and the target second virtual object 405 constitute a new group 410. In addition, after the new group 410 is constituted, the terminal device associated with the user 1 may cancel the zoom-in mode of the target second virtual object 405. Finally, the terminal device associated with the user 1 may keep a display location of the new group 410 on the first human-computer interaction interface unchanged, and move, relative to the new group 410, a virtual object and a group on the first human-computer interaction interface other than the new group 410, so that the new group 410 is located at a junction 411 between the region in which the plurality of virtual objects are distributed and the region in which the plurality of groups are distributed.

In some other embodiments, the plurality of virtual objects may include a first virtual object and at least one second virtual object. The first virtual object (for example, the virtual object A controlled by the user 1) is a virtual object able to be controlled on the first human-computer interaction interface. The second virtual object is any one of the plurality of virtual objects other than the first virtual object. In this case, the terminal device may further perform the following processing: displaying corresponding notification information on the first human-computer interaction interface in response to an interaction request of a target second virtual object (for example, the virtual object B controlled by the user 2) for the first virtual object, for example, in a case that an interaction request transmitted by the target second virtual object is received, that is, a step of the first virtual object agreeing to interaction may be added on the first human-computer interaction interface; and moving the target second virtual object to a location of the first virtual object after a confirmation operation performed by the first virtual object on the notification information is received, for example, the target second virtual object may be controlled to disappear from a virtual channel in which the target second virtual object is currently located and appear in a virtual channel in which the first virtual object is located, so that the first virtual object and the target second virtual object constitute a new group different from the plurality of groups. The target second virtual object is a second virtual object that needs to interact with the first virtual object, and the interaction request is transmitted by a terminal device running a second human-computer interaction interface (for example, the terminal device associated with the user 2). For example, the terminal device associated with the user 2 transmits an interaction request to the terminal device associated with the user 1 after receiving an interaction trigger operation triggered by the user 2 for the first virtual object. The second human-computer interaction interface is used for controlling the target second virtual object.

Figure 4E:
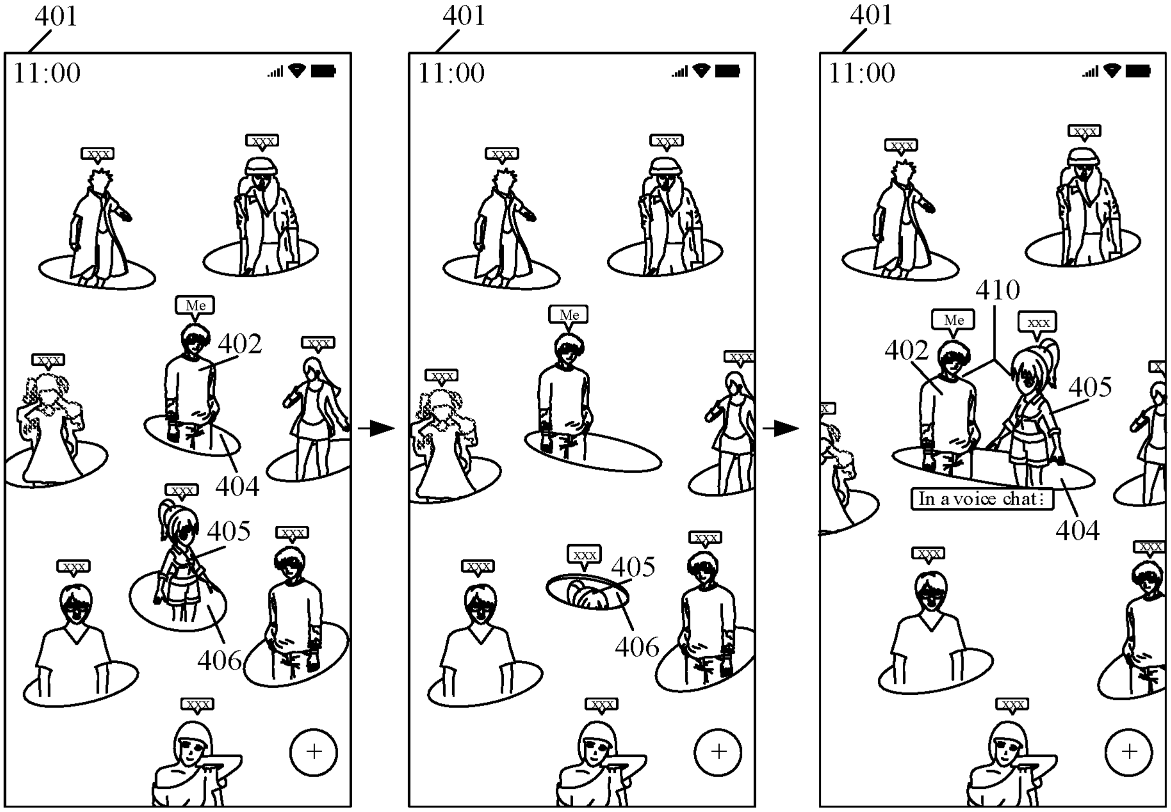

For example, FIG. 4E is a schematic diagram of an application scenario of an interaction data processing method according to an embodiment of this disclosure. As shown in FIG. 4E, the first part 401 of the virtual space is displayed on the first human-computer interaction interface, the first part 401 includes the first virtual object 402 (for example, the virtual object A controlled by the user 1), and the first virtual object 402 is located in the virtual channel 404. Then the terminal device (for example, the terminal device associated with the user 1) displays disappearance of the target second virtual object 405 (for example, the virtual object B controlled by the user 2) from the virtual channel 406 in which the target second virtual object 405 is currently located and appearance of the target second virtual object 405 in the virtual channel 404 in which the first virtual object 402 is located when receiving an interaction request of the target second virtual object 405 in the first part 401 for the first virtual object 402, for example, in a case that the terminal device associated with the user 2 receives a selection operation performed by the user 2 on the first virtual object 402 and transmits the interaction request to the terminal device associated with the user 1, so that the first virtual object 402 and the target second virtual object 405 constitute a new group 410. In addition, prompt information indicating that the first virtual object 402 and the target second virtual object 405 are in a voice chat may be displayed below the new group 410.

In some embodiments, the plurality of virtual objects may include a first virtual object and at least one second virtual object. The first virtual object (for example, the virtual object A controlled by the user 1) is a virtual object able to be controlled on the first human-computer interaction interface. The second virtual object is any one of the plurality of virtual objects other than the first virtual object. In a case that the first part includes the first virtual object and the second part does not include the first virtual object, the terminal device (for example, the terminal device associated with the user 1) may further perform the following processing after switching the first part displayed on the first human-computer interaction interface to the second part of the virtual space: moving the first virtual object and a target second virtual object (for example, the virtual object B controlled by the user 2, where the virtual object B may also be located in the first part) to the second part in response to an interaction request of the target second virtual object for the first virtual object. For example, a new virtual channel may be displayed in the second part, and appearance of the first virtual object and the target second virtual object in the new virtual channel is displayed, so that the first virtual object and the target second virtual object constitute a new group different from the plurality of groups. The target second virtual object is a second virtual object that needs to interact with the first virtual object, the interaction request is transmitted by a terminal device running a second human-computer interaction interface, and the second human-computer interaction interface is used for controlling the target second virtual object.

Figure 4F:
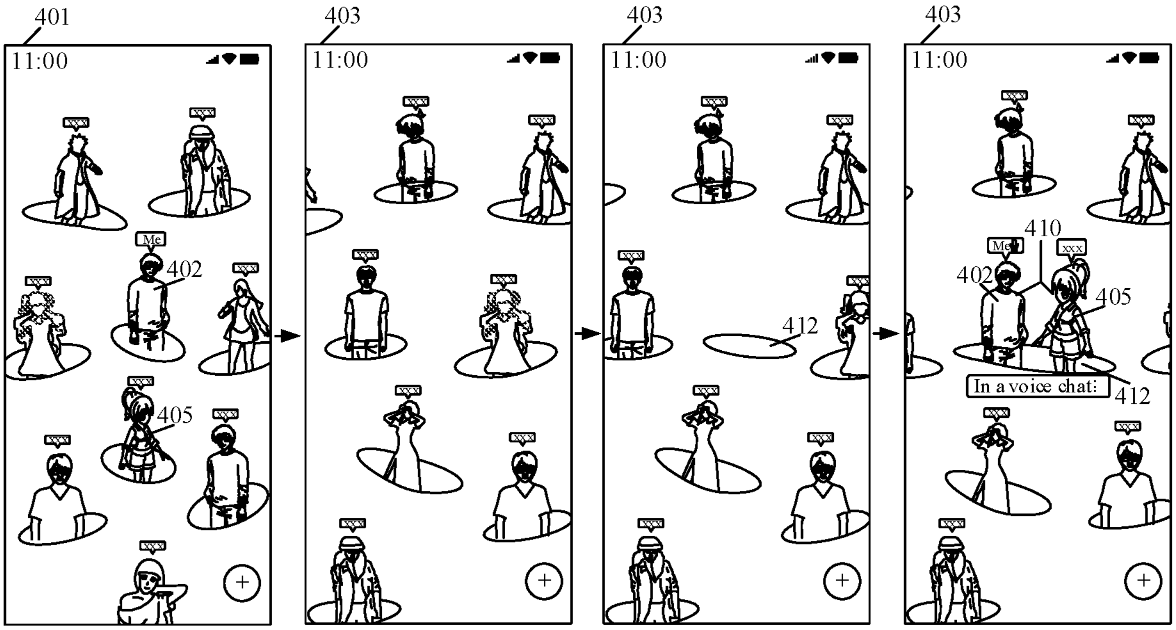

For example, FIG. 4F is a schematic diagram of an application scenario of an interaction data processing method according to an embodiment of this disclosure. As shown in FIG. 4F, the first part 401 of the virtual space is displayed on the first human-computer interaction interface, and the first virtual object 402 (for example, the virtual object A controlled by the user 1) and the target second virtual object 405 (for example, the virtual object B controlled by the user 2) are displayed in the first part 401. Then the terminal device (for example, the terminal device associated with the user 1) switches the first part 401 displayed on the first human-computer interaction interface to the second part 403 of the virtual space in response to a virtual space browse operation triggered by the user 1 (for example, in a case that a slide operation performed by the user 1 on the first human-computer interaction interface in received), where the second part 403 does not include the first virtual object 402 or the target second virtual object 405. It is assumed that the terminal device associated with the user 1 receives an interaction request of the target second virtual object 405 for the first virtual object 402. For example, the terminal device associated with the user 1 receives an interaction request transmitted by the terminal device associated with the user 2. In this case, a new virtual channel 412 may be displayed in the second part 403, for example, a new circle may be displayed in the second part 403, and appearance of the first virtual object 402 and the target second virtual object 405 in the new virtual channel 412 may be displayed, so that the first virtual object 402 and the target second virtual object 405 constitute a new group 410. In this way, a user can learn of a current status of a virtual object controlled by the user in a timely manner.

In some embodiments, the plurality of virtual objects may include a first virtual object and at least one second virtual object. The first virtual object (for example, the virtual object A controlled by the user 1) is a virtual object able to be controlled on the first human-computer interaction interface. The second virtual object is any one of the plurality of virtual objects other than the first virtual object. Then the terminal device (for example, the terminal device associated with the user 1) may further perform the following processing in a case that the first part or the second part includes the first virtual object and any second virtual object (for example, the virtual object B controlled by the user 2) is in a field of view of the first virtual object: in response to that any second virtual object receives an interaction request from another second virtual object (for example, the virtual object C controlled by the user 3) and the first virtual object has a social relationship with at least one of the any second virtual object and the another second virtual object (for example, the user 1 has a friendship with at least one of the user 2 and the user 3), moving the another second virtual object to a location of the any second virtual object, for example, appearance of the another second virtual object in a virtual channel in which the any second virtual object is located may be displayed, to constitute a new group different from the plurality of groups; or in response to that any second virtual object receives an interaction request from another second virtual object and the first virtual object does not have a social relationship with either of the any second virtual object and the another second virtual object (for example, the user 1 does not have a friendship with either of the user 2 and the user 3), moving the any second virtual object out of a field of view of the first virtual object.

Figure 4G:
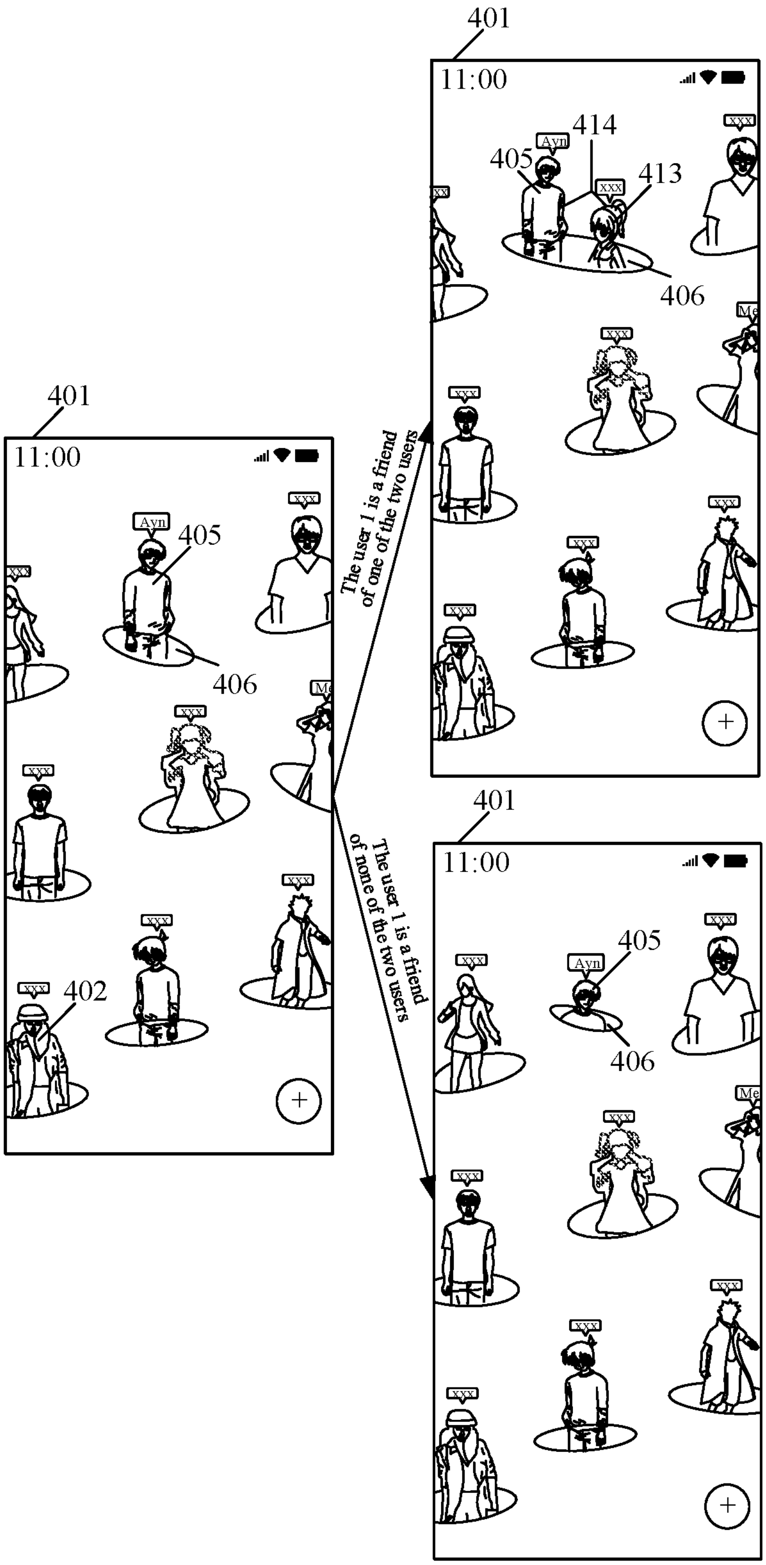

For example, FIG. 4G is a schematic diagram of an application scenario of an interaction data processing method according to an embodiment of this disclosure. As shown in FIG. 4G, the first part 401 of the virtual space is displayed on the first human-computer interaction interface, and the first virtual object 402 (for example, the virtual object A controlled by the user 1) is displayed in the first part 401. In addition, any second virtual object 405 (for example, the virtual object B controlled by the user 2) is in a field of view of the first virtual object 402. Then, in response to that the any second virtual object 405 receives an interaction request transmitted by another second virtual object 413 (for example, the virtual object C controlled by the user 3) and the first virtual object 402 has a social relationship with at least one of the any second virtual object 405 and the another second virtual object 413 (for example, the user 1 has a friendship with at least one of the user 2 and user the 3), the terminal device (for example, the terminal device associated with the user 1) displays appearance of the another second virtual object 413 in a virtual channel 406 in which the any second virtual object 405 is located, so that the any second virtual object 405 and the another second virtual object 413 constitute a new group 414 different from the plurality of groups. Alternatively, in response to that the any second virtual object 405 receives an interaction request transmitted by another second virtual object 413 and the first virtual object 402 does not have a social relationship with either of the any second virtual object 405 and the another second virtual object 413 (for example, the user 1 does not have a friendship with either of the user 2 and the user 3), the terminal device associated with the user 1 may display appearance of the any second virtual object 405 from a virtual channel 406 in which the any second virtual object 405 is currently located.

In some embodiments, in a case that the object selection operation is performed on the first part, the first part includes the new group, and the second part does not include the new group, the terminal device (for example, the terminal device associated with the user 1) may further perform the following processing after switching the first part displayed on the first human-computer interaction interface to the second part of the virtual space, for example, after the user 1 selects a virtual object that needs to perform interaction on the first screen to constitute a new group and performs a slide operation to slide to the second screen: displaying a prompt control in the second part, the prompt control being used for indicating that the first virtual object and the target second virtual object are still in an interactive state; and perform one of the following in response to a trigger operation on the prompt control: moving the new group from the first part to the second part, and canceling the display of the prompt control in the second part; or switching the second part displayed on the first human-computer interaction interface back to the first part, and canceling the display of the prompt control in the second part.

Figure 4H:
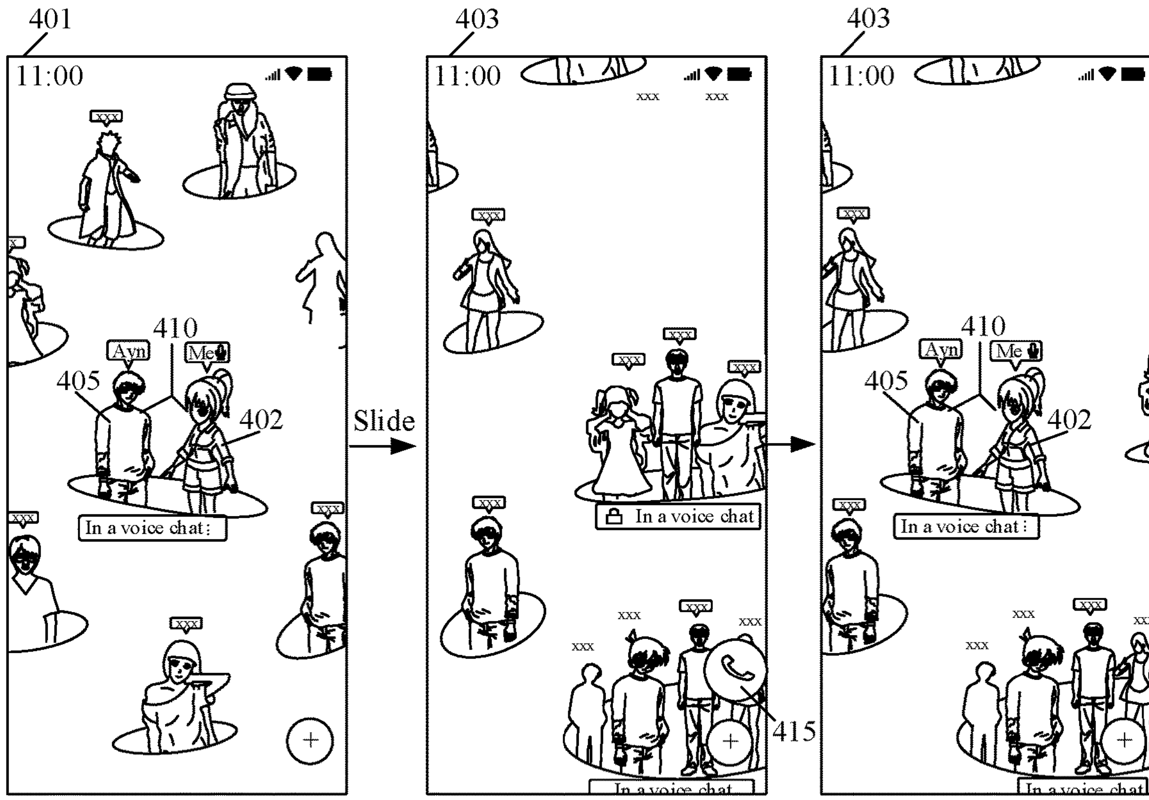

For example, FIG. 4H is a schematic diagram of an application scenario of an interaction data processing method according to an embodiment of this disclosure. As shown in FIG. 4H, the first part 401 of the virtual space is displayed on the first human-computer interaction interface, and the first part 401 includes the new group 410 constituted by the first virtual object 402 (for example, the virtual object A controlled by the user 1) and the target second virtual object 405 (for example, the virtual object B controlled by the user 2). Then the terminal device (for example, the terminal device associated with the user 1) switches the first part 401 displayed on the first human-computer interaction interface to the second part 403 of the virtual space in response to a virtual space browse operation, for example, in a case that a slide operation performed by the user 1 on the first human-computer interaction interface is received, where the second part 403 does not include the new group 410; and displays a prompt control 415 in the second part 403 for indicating that the user 1 is currently still in a voice chat. Then, in a case that a tap operation performed by the user 1 on the prompt control 415 is received, the new group 410 may be moved from the first part 401 to the second part 403, and the display of the prompt control 415 is canceled in the second part 403. In this way, a user can process a current group without a slide operation. This improves user experience.

In some other embodiments, in a case that the object selection operation is performed on the first part, the first part includes the new group, and the second part does not include the new group, the terminal device may switch the first part displayed on the first human-computer interaction interface to the second part of the virtual space in response to the virtual space browse operation in the following manner: in response to the virtual space browse operation, keeping a location of the new group on the first human-computer interaction interface unchanged, and switching a virtual object and a group in the first part other than the new group to a virtual object and a group that are included in the second part of the virtual space. For example, the virtual space browse operation is a slide operation. During sliding by a user, a group to which a virtual object controlled by the user belongs is always kept on the screen, and only other content is switched during sliding by the user. This enables the user to conveniently manage a current group and improves user experience.

Figure 6B:
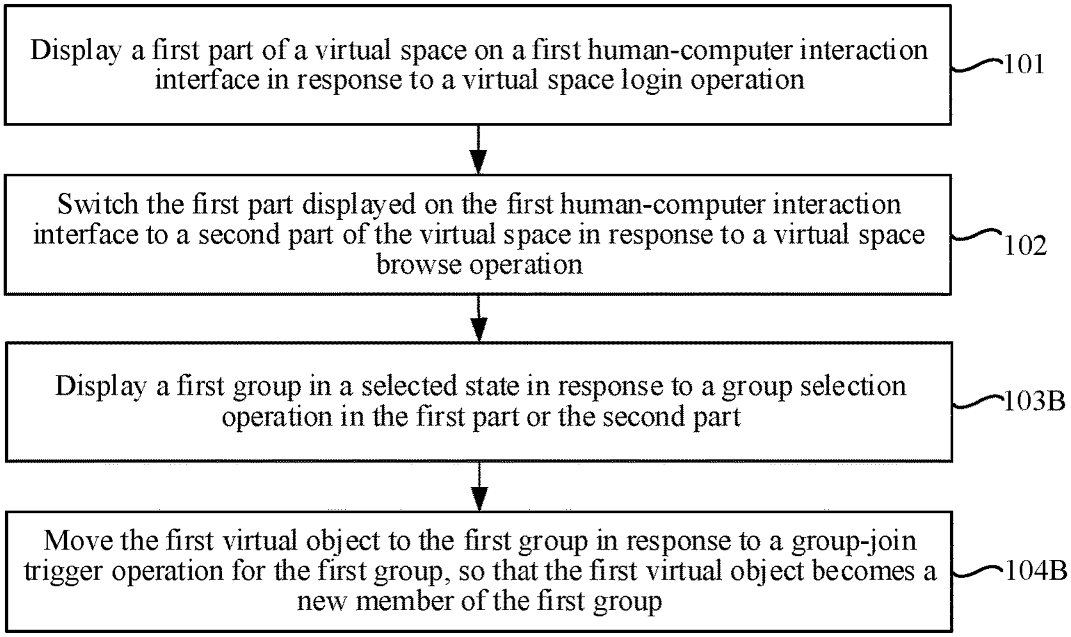

In some embodiments, the plurality of virtual objects may include a first virtual object (for example, the virtual object A controlled by the user 1), and the first virtual object is a virtual object able to be controlled on the first human-computer interaction interface. In this case, step 103B and step 104B shown in FIG. 6B may be further performed after step 102 shown in FIG. 3 is completed. This is described with reference to steps shown in FIG. 6B.

In step 103B, a first group in a selected state is displayed in response to a group selection operation in the first part or the second part.

Herein, the first group is a group selected by the group selection operation from the plurality of groups.

In some embodiments, for example, the first virtual object is the virtual object A controlled by the user 1. The terminal device (for example, the terminal device associated with user 1) displays the first group in the selected state (for example, a focused state) in a zoom-in mode in response to a group selection operation triggered by the user 1 in the first part, for example, in a case that the user 1 directly selects a group to join (namely, the first group) on the first screen, or in response to a group selection operation triggered in the second part, for example, in a case that the user 1 first performs a slide operation and selects a group to join (namely, the first group) on a second screen displayed after the sliding.

In step 104B, the first virtual object is moved to the first group in response to a group-join trigger operation for the first group, so that the first virtual object becomes a new member of the first group.

In some embodiments, the terminal device may further display a corresponding join control (for example, a "Join chat" control) and View member control when displaying the first group in the selected state; may move the first virtual object to the first group when receiving a trigger operation on the join control, for example, may display appearance of the first virtual object in a virtual channel in which the first group is located, so that the first virtual object becomes a new member of the first group; and may display a member included in the first group and basic information of each member on the first human-computer interaction interface when receiving a trigger operation on the View member control.

Figure 4I:
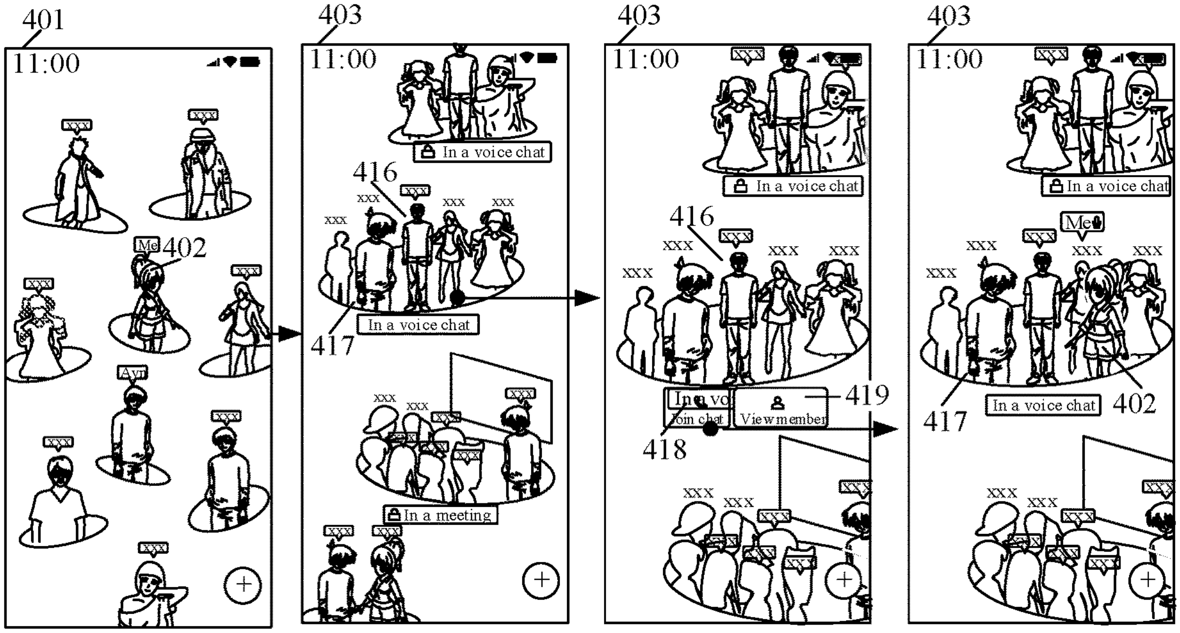

For example, FIG. 4I is a schematic diagram of an application scenario of an interaction data processing method according to an embodiment of this disclosure. As shown in FIG. 4I, the first part 401 of the virtual space is displayed on the first human-computer interaction interface, and the first virtual object 402 (for example, the virtual object A controlled by the user 1) is displayed in the first part 401. Then the terminal device (for example, the terminal device associated with the user 1) switches the first part 401 displayed on the first human-computer interaction interface to the second part 403 of the virtual space in response to a virtual space browse operation, where a plurality of groups are displayed in the second part 403. Then a first group 416 (the first group 416 is in a virtual channel 417) in a selected state (for example, a focused state) may be displayed when a selection operation performed by the user 1 on the first group 416 is received. For example, the first group 416 in the selected state and a corresponding Join chat control 418 and View member control 419 are displayed in a zoom-in mode. Appearance of the first virtual object 402 in the virtual channel 417 in which the first group 416 is located may be displayed when a trigger operation performed by the user 1 on the Join chat control 418 is received, so that the first virtual object 402 becomes a new member of the first group 416.

In some embodiments, in a case that the first group is a private group (for example, a semi-public group), the terminal device may further perform the following processing before moving the first virtual object to the first group: in response to that the first virtual object meets a specified group-join condition, proceeding to processing of moving the first virtual object to the first group, the group-join condition including at least one of the following: verification on a password succeeds, and verification on a group-join request succeeds. For example, for a semi-public group, a user needs to meet a condition specified by a creator of the group to join the group, for example, transmits a request to the creator or enters a correct password to join the group.

Figure 4J:
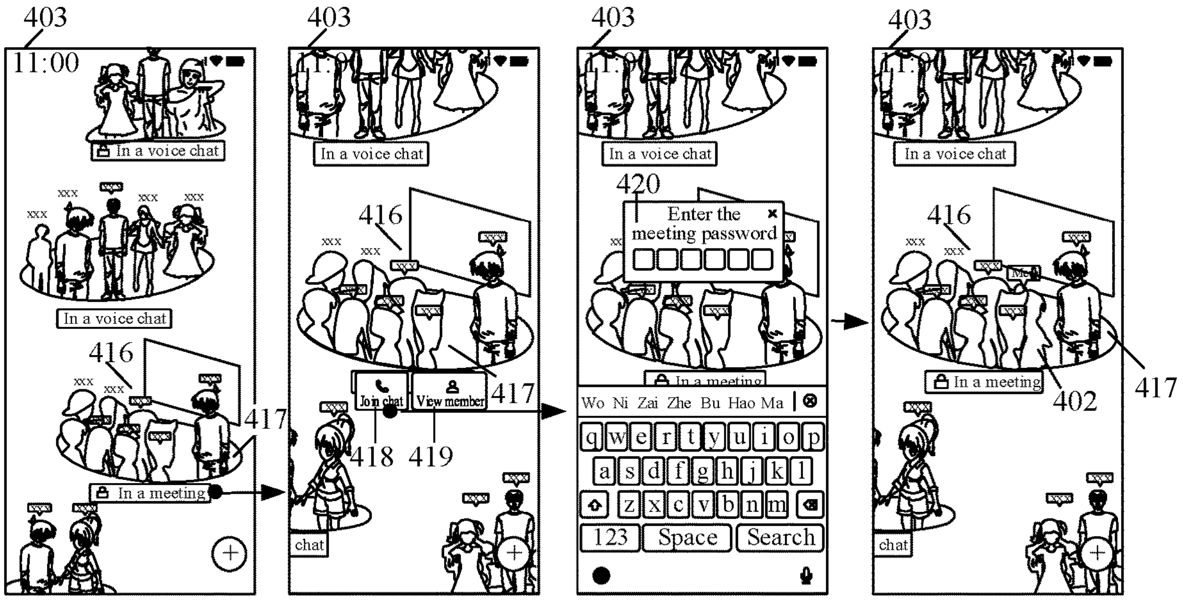

For example, FIG. 4J is a schematic diagram of an application scenario of an interaction data processing method according to an embodiment of this disclosure. As shown in FIG. 4J, the second part 403 of the virtual space is displayed on the first human-computer interaction interface, and a plurality of groups are displayed in the second part 403. When receiving a selection operation performed by the user 1 on the first group 416 (the first group 416 being a private group) located in the virtual channel 417, the terminal device (for example, the terminal device associated with the user 1) may display the first group 416 in a selected state, for example, may display the first group 416 in the selected state and a corresponding Join chat control 418 and View member control 419 in a zoom-in mode. When a trigger operation performed by the user 1 on the Join chat control 418 is received, a pop-up window 420 may be displayed in the second part 403 for prompting the user 1 to enter a meeting password. After receiving a password entered by the user 1 in the pop-up window 420, the terminal device associated with the user 1 may transmit the password to a background server of the virtual space, so that the background server performs verification. When receiving verification success notification information transmitted by the server, the terminal device associated with the user 1 may display appearance of the first virtual object 402 in the virtual channel 417 in which the first group 416 is located, so that the first virtual object 402 becomes a new member of the first group 416.

In some other embodiments, the terminal device may further perform the following processing after moving the first virtual object (for example, the virtual object A controlled by the user 1) to the first group so that the first virtual object becomes a new member of the first group: displaying an entry for transmitting a message to a target second virtual object (for example, the virtual object B controlled by the user 2) in response to an object selection operation for the first group, the target second virtual object being a second virtual object selected by the object selection operation from the first group; displaying a message editing control in response to a trigger operation for the entry, the message editing control being used for editing a first message, and the first message being visible only to the first virtual object and the target second virtual object; transmitting the first message to the target second virtual object in response to a transmission trigger operation; and displaying a second message (for example, a reply message for the first message) that comes from the target second virtual object, the second message being visible only to the first virtual object and the target second virtual object.

Figure 4K:
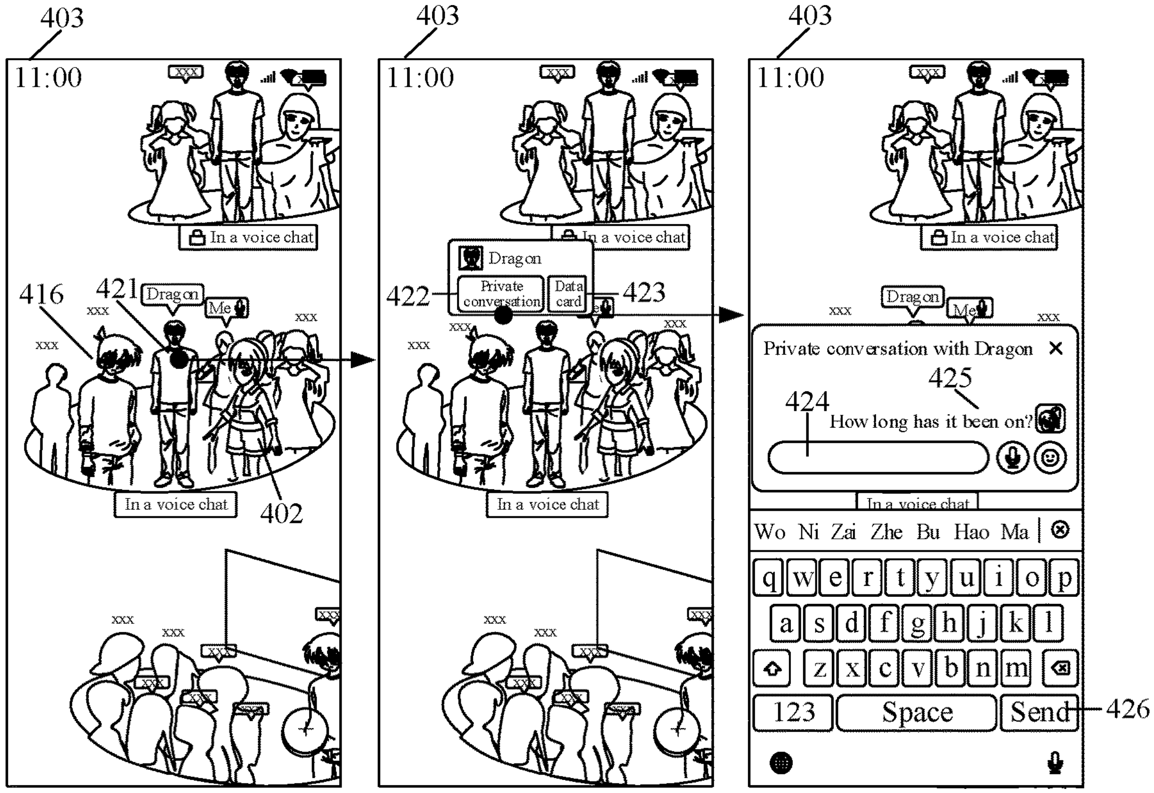

For example, FIG. 4K is a schematic diagram of an application scenario of a virtual object processing method according to an embodiment of this disclosure. As shown in FIG. 4K, the second part 403 of the virtual space is displayed on the first human-computer interaction interface. The terminal device (for example, the terminal device associated with the user 1) may further perform the following processing after moving the first virtual object 402 (for example, the virtual object A controlled by the user 1) to the first group 416 included in the second part 403 so that the first virtual object 402 becomes a new member of the first group 416: displaying a corresponding "Private conversation" control 422 and "Data card" control 423 in response to a selection operation performed by the user 1 on a target second virtual object 421 (for example, the virtual object B controlled by the user 2) in the first group 416. In a case that a tap operation performed by the user 1 on the "Private conversation" control 422 is received, a message editing control (for example, a character input box 424) may be displayed in the second part 403 for editing a first message 425 to be transmitted to the target second virtual object 412, for example, "How long has it been on?" Then the first message 425 is transmitted to the target second virtual object 421 when a trigger operation performed by the user 1 on a Send control 426 is received. For example, the terminal device associated with the user 1 transmits the first message 425 to a terminal device associated with the user 4 when receiving a tap operation performed on the Send control 426. The first message 425 is visible only to the first virtual object 402 and the target second virtual object 421.

Figure 4L:
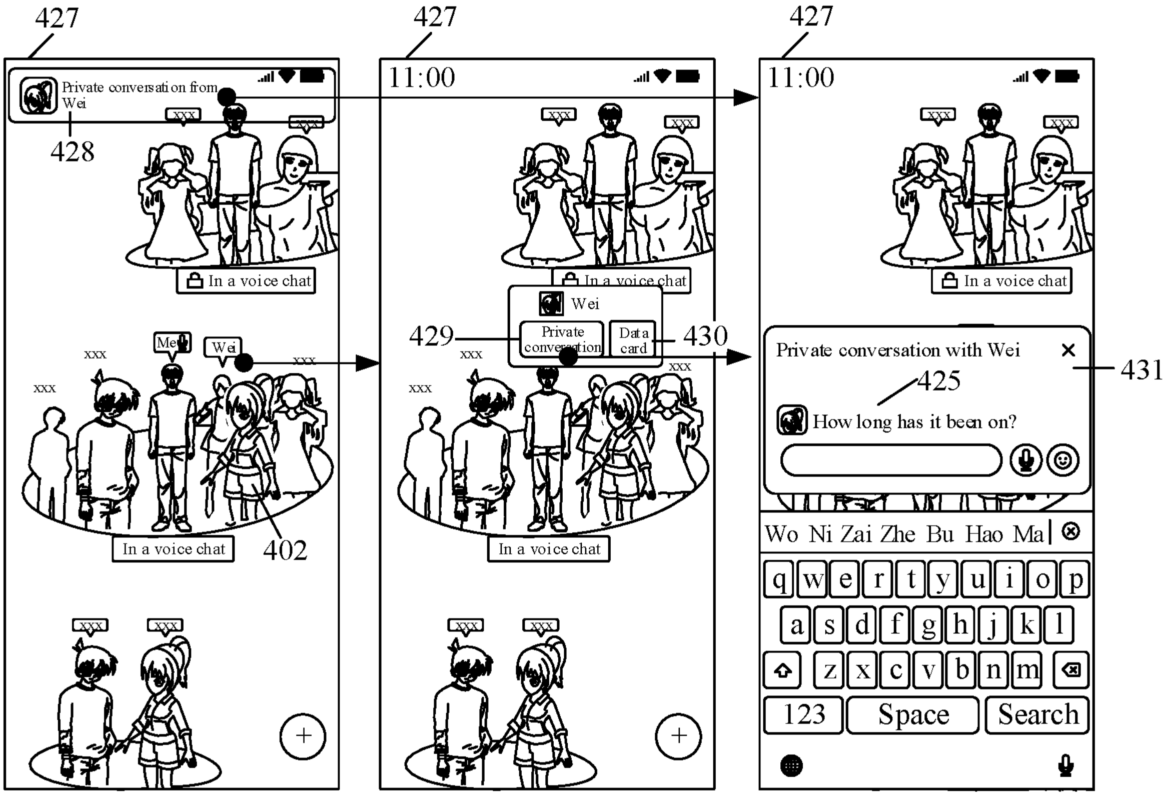

In some other embodiments, with reference to the foregoing example, FIG. 4L is a schematic diagram of an application scenario of an interaction data processing method according to an embodiment of this disclosure. As shown in FIG. 4L, after the target second virtual object (for example, the virtual object B controlled by the user 2) receives the first message transmitted by the first virtual object (for example, the virtual object A controlled by the user 1), a corresponding prompt message 428, for example, "Private conversation from Wei", may be displayed on a second human-computer interaction interface 427 for controlling the target second virtual object. The user 2 may tap the prompt message 428 to view and reply to the first message (namely, a private message) transmitted by the first virtual object. In addition, after closing the private message, the user 2 may further tap a private message entry for the first virtual object to view the private message in this connection again. For example, when a terminal device associated with the user 2 receives a selection operation (for example, a tap operation) performed by the user 2 on the first virtual object 402, a corresponding "Private conversation" control 429 and "Data card" control 430 are displayed on the second human-computer interaction interface 427. When a tap operation performed by the user 2 on the "Private conversation" control 429 is received, a dialog box 431 may be displayed on the second human-computer interaction interface 427, and the first message 425 transmitted by the first virtual object is displayed in the dialog box 431.

In some embodiments, the terminal device (for example, the terminal device associated with the user 1) may further perform the following processing: highlighting a target member in the first group, a display parameter of the target member being different from a display parameter of another member (for example, a height of the target member is greater than a height of the another member), the target member (for example, the virtual object B controlled by the user 2, where the user 2 has a friendship with the user 1) being a virtual object in the first group that has a social relationship with the first virtual object, and the another member being a virtual object in the first group other than the target member; and moving the first virtual object to a location adjacent to the target member after the first virtual object becomes a new member of the first group. For example, the first virtual object may be moved into a field of view of the target member, for example, in front of the target member. Certainly, the first virtual object may alternatively be moved out of the field of view of the target member, for example, to a location adjacent to, but not necessarily visible to, the target member, for example, behind the target member.

Figure 4M:
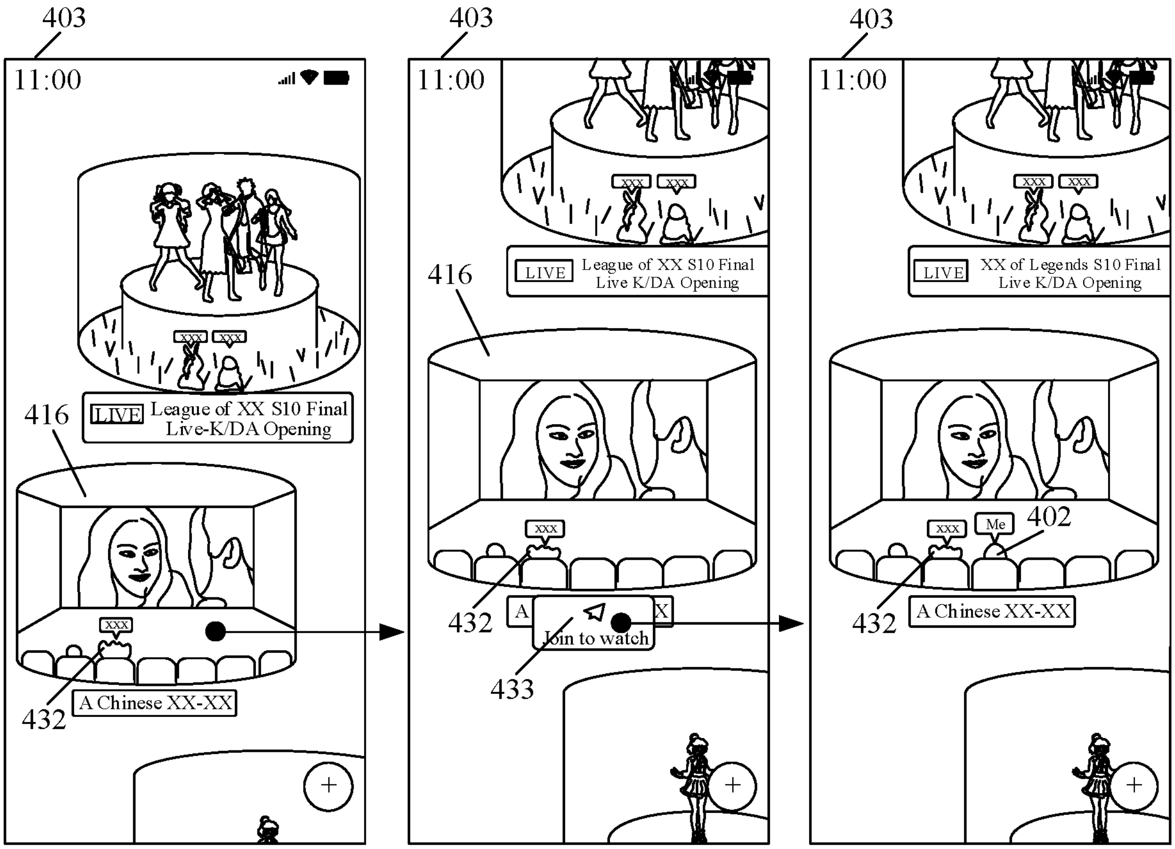

For example, FIG. 4M is a schematic diagram of an application scenario of an interaction data processing method according to an embodiment of this disclosure. As shown in FIG. 4M, the second part 403 of the virtual space is displayed on the first human-computer interaction interface, and a plurality of groups are displayed in the second part 403. With respect to the first group 416 in the plurality of groups, a target member 432 may be highlighted in the first group 416 (for example, a height of the target member 432 is greater than a height of another member). The target member 432 (for example, the virtual object B controlled by the user 2) is a virtual object that has a social relationship with the first virtual object (for example, the virtual object A controlled by the user 1) (for example, the user 1 has a friendship with the user 2). Then the terminal device (for example, the terminal device associated with the user 1) displays a corresponding "Join to watch" control 433 when receiving a selection operation performed by the user 1 on the first group 416. When a tap operation performed by the user 1 on the "Join to watch" control 433 is received, the first virtual object 402 may be moved to the first group 416, and a location of the first virtual object 402 in the first group 416 is adjacent to the target member 432. For example, the first virtual object 402 may appear on the right of the target member 432.

In some other embodiments, the terminal device (for example, the terminal device associated with the user 1) may further perform the following processing after controlling the first virtual object (for example, the virtual object A controlled by the user 1) to move to the first group so that the first virtual object becomes a new member of the first group: displaying prompt information in response to that an invitation request for joining a second group is received (for example, the user 2 transmits, to the user 1, an invitation to join the second group) or a selection operation performed on a second group in the plurality of groups is received (for example, the user 1 actively joins the second group), the prompt information being used for prompting the first virtual object to exit the first group and join the second group; and moving the first virtual object from the first group to the second group in response to a confirmation operation performed on the prompt information, so that the first virtual object exits the first group and becomes a new member of the second group.

Figure 4N:
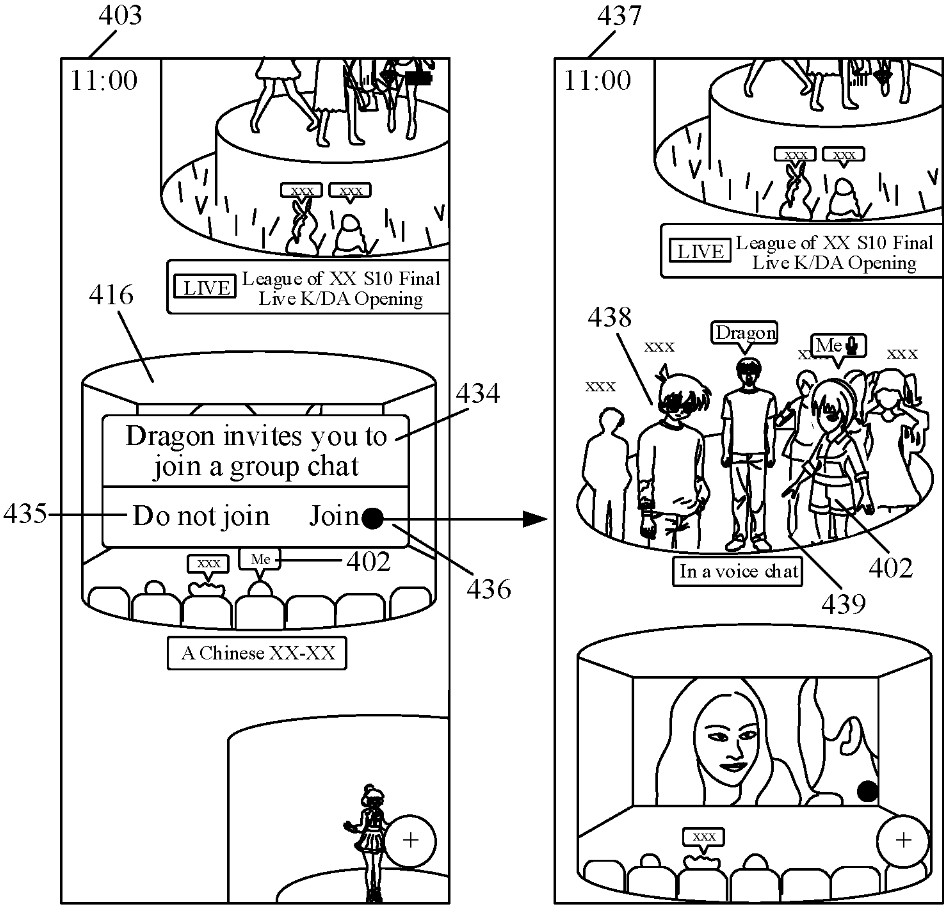

For example, FIG. 4N is a schematic diagram of an application scenario of an interaction data processing method according to an embodiment of this disclosure. As shown in FIG. 4N, the second part 403 of the virtual space is displayed on the first human-computer interaction interface, the first group 416 is displayed in the second part 403, and the first group 416 includes the first virtual object 402 (for example, the virtual object A controlled by the user 1, in other words, the virtual object A controlled by the user 1 currently belongs to the first group 416). Then the terminal device (for example, the terminal device associated with the user 1) may display prompt information 434, for example, "Dragon invites you to join a group chat", in the second part 403 when receiving an invitation request transmitted by a friend (for example, a user nicknamed "Dragon") of the user 1. A "Do not join" control 435 and a "Join" control 436 are displayed in the prompt information 434. When a tap operation performed by the user 1 on the "Join" control 436 is received, the first virtual object 402 is moved from the first group 416 to a second group 438. The second group 438 may be located in a third part 437 of the virtual space. For example, the terminal device associated with the user 1 may switch the second part 403 displayed on the first human-computer interaction interface to the third part 437 of the virtual space, and display appearance of the first virtual object 402 in a virtual channel 439 in which the second group 438 is located, so that the first virtual object 402 exits the first group 416 and becomes a new member of the second group 438.

Figure 4O:
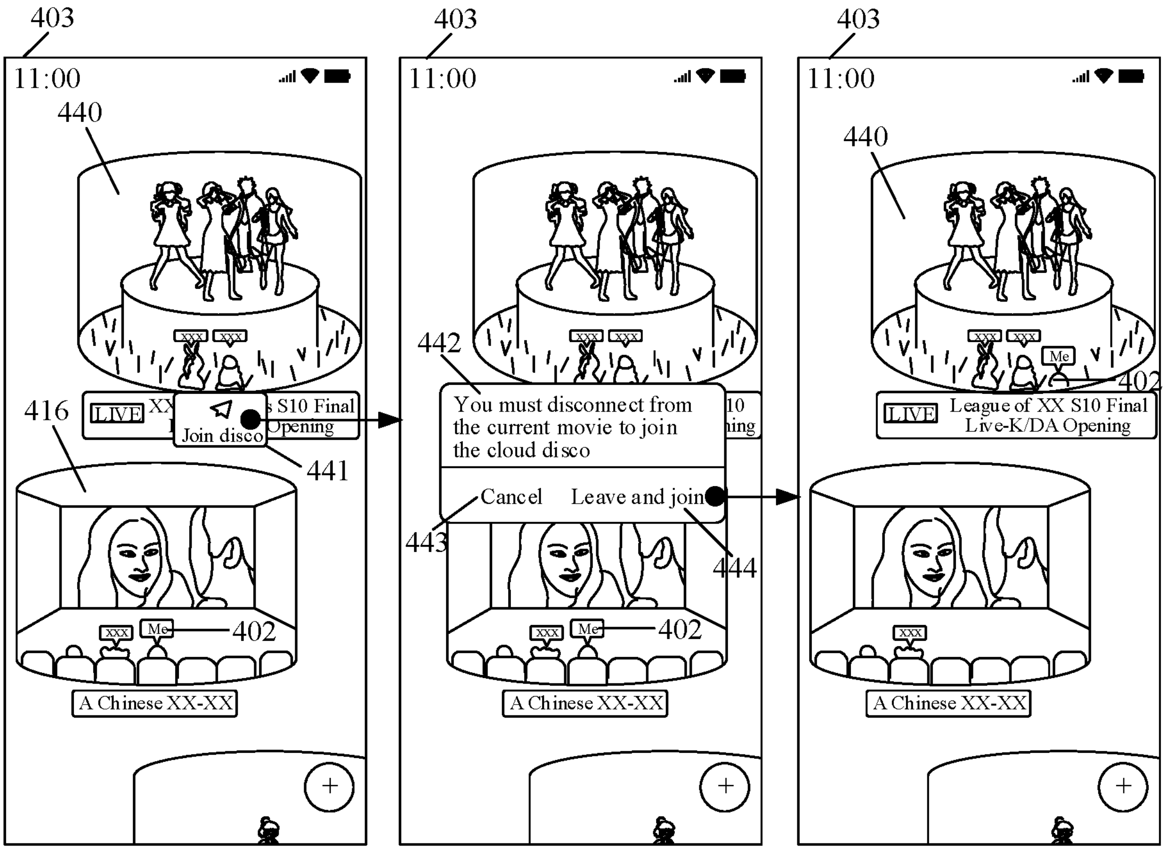

For example, FIG. 4O is a schematic diagram of an application scenario of an interaction data processing method according to an embodiment of this disclosure. As shown in FIG. 4O, the second part 403 of the virtual space is displayed on the first human-computer interaction interface, the first group 416 is displayed in the second part 403, and the first group 416 includes the first virtual object 402 (for example, the virtual object A controlled by the user 1, in other words, the virtual object A controlled by the user 1 currently belongs to the first group 416). Then the terminal device (for example, the terminal device associated with the user 1) receives a selection operation performed by the user 1 on a second group 440 in the second part 403, and displays a corresponding "Join disco" control 441. When a tap operation performed by the user 1 on the "Join disco" control 441 is received, prompt information 442, for example, "You must disconnect from the current movie to join the cloud disco", may be displayed in the second part 403. In addition, a "Cancel" control 443 and a "Leave and join" control 444 are further displayed in the prompt information 442. When a tap operation performed by the user 1 on the "Leave and join" control 444 is received, the first virtual object 402 may be moved from the first group 416 to the second group 440, so that the first virtual object 402 exits the first group 416 and becomes a new member of the second group 440.

In some embodiments, the plurality of virtual objects may include a first virtual object (for example, the virtual object A controlled by the user 1) and at least one second virtual object. The first virtual object is a virtual object able to be controlled on the first human-computer interaction interface. The second virtual object is any one of the plurality of virtual objects other than the first virtual object. In this case, the terminal device (for example, the terminal device associated with the user 1) may further perform the following processing: displaying a group creation control on the first human-computer interaction interface; in response to a trigger operation for the group creation control, displaying a group chat mode setting control and at least one second virtual object (for example, the virtual object B controlled by the user 2, where the user 1 has a friendship with the user 2) that has a social relationship with the first virtual object, a selection control being displayed on each second virtual object for inviting the second virtual object to join a new group different from the plurality of groups, for example, assuming that the virtual object B is selected, the terminal device associated with the user 1 transmits, to the terminal device associated with the user 2, an invitation request for joining a new group; and displaying at least one of the following controls in response to a trigger operation for the group chat mode setting control: a theme control for setting a theme of the new group; a type control for setting a type (for example, a round table mode or a presenter mode) of the new group; a visibility range control for setting a visibility range (for example, visible to all or visible only to a friend) of the new group; and a join manner control for setting a manner of joining the new group (for example, visible to all or a password required for joining).

Figure 4P:
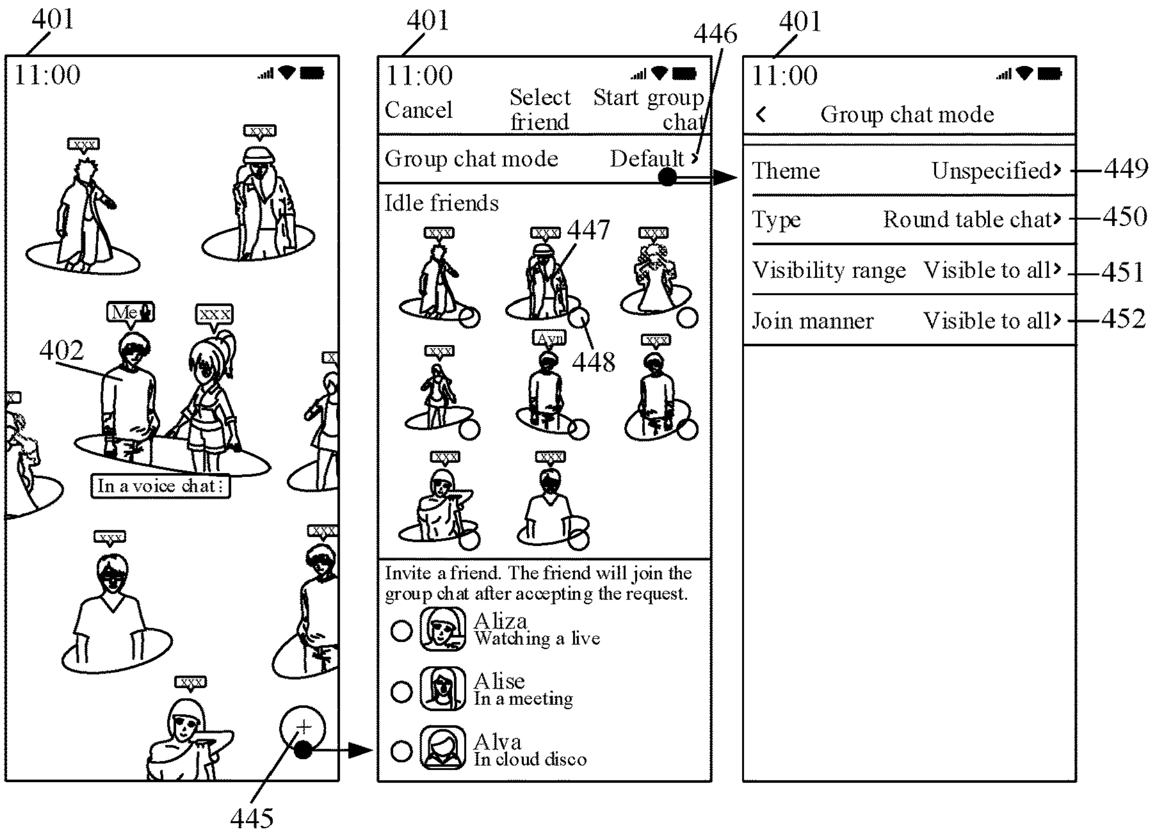

For example, FIG. 4P is a schematic diagram of an application scenario of an interaction data processing method according to an embodiment of this disclosure. As shown in FIG. 4P, the first part 401 of the virtual space is displayed on the first human-computer interaction interface, and a group creation control 445 is displayed in the first part 401. When a tap operation performed by the user 1 on the group creation control 445 is received, a group chat mode setting control 446 and a plurality of second virtual objects in a solitary state that have a social relationship with the first virtual object 402 are displayed, and a corresponding selection control is further displayed on each second virtual object. For example, a second virtual object 447 (for example, the virtual object B controlled by the user 2, where the user 1 has a friendship with the user 2) is used as an example. A selection control 448 is further displayed in a lower right corner of the second virtual object 447. When receiving a tap action performed by the user 1 on the group chat mode setting control 446, the terminal device (for example, the terminal device associated with the user 1) displays a theme control 449, a type control 450, a visibility range control 451, and a join manner control 452 for the user 1 to set a group chat mode.

In some embodiments, the plurality of virtual objects may include a first virtual object (for example, the virtual object A controlled by the user 1). The first virtual object is a virtual object able to be controlled on the first human-computer interaction interface. In this case, the terminal device (for example, the terminal device associated with the user 1) may further perform the following processing: displaying a setting entry on the first human-computer interaction interface; and displaying at least one of the following controls in response to a trigger operation for the setting entry: a face adjustment control for adjusting a face image of the first virtual object, for example, a plurality of candidate face images may be displayed when a trigger operation performed by the user 1 on the face adjustment control is received, and a current face image of the first virtual object is replaced with a selected target face image in response to a selection operation for the plurality of candidate face images; a clothing control for adjusting clothing of the first virtual object, for example, a plurality of pieces of candidate virtual clothing may be displayed when a trigger operation performed by the user 1 on the clothing control is received, and virtual clothing currently worn by the first virtual object is replaced with selected target virtual clothing in response to a selection operation for the plurality of pieces of candidate virtual clothing; and an action control for setting an action of the first virtual object.

Figure 4Q:
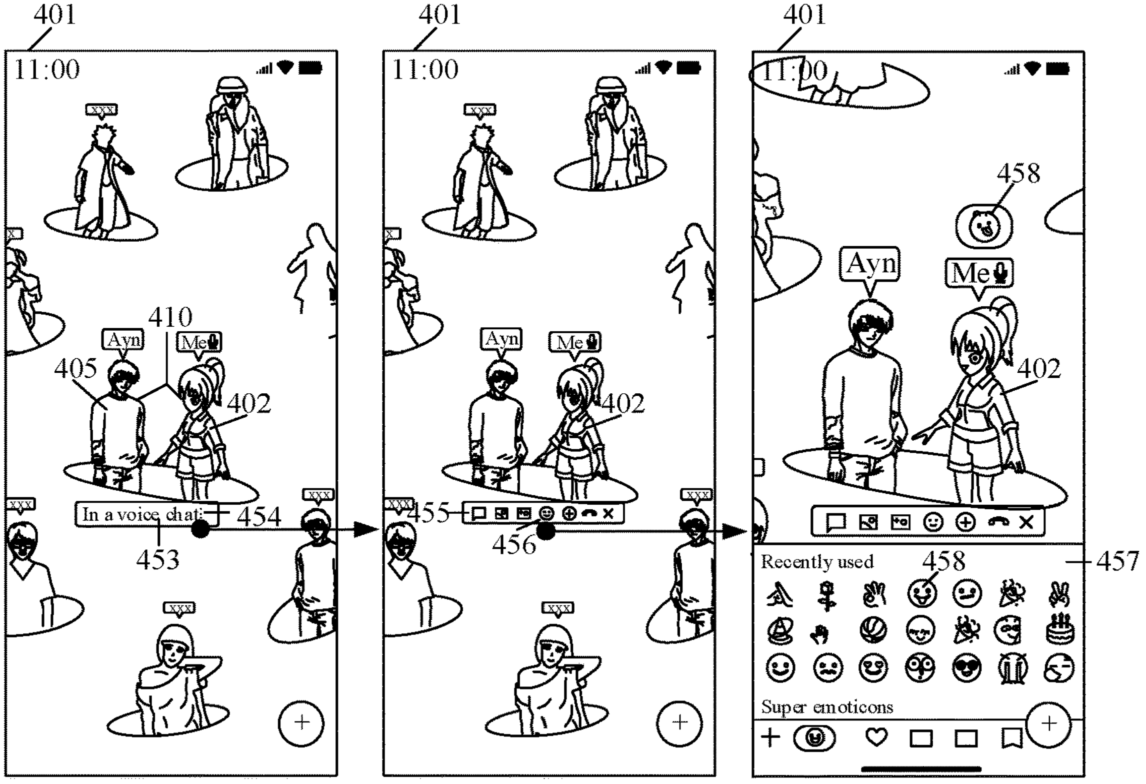

In some other embodiments, in addition to establishing a voice chat as a connection, different virtual objects may further communicate with each other by using various types of messages, for example, a text message, an emoticon, a picture, and a file. For example, FIG. 4Q is a schematic diagram of an application scenario of an interaction data processing method according to an embodiment of this disclosure. As shown in FIG. 4Q, the first part 401 of the virtual space is displayed on the first human-computer interaction interface, a new group 410 including the first virtual object 402 (for example, the virtual object A controlled by the user 1) and a target second virtual object 405 (for example, the virtual object B controlled by the user 2) is displayed in the first part 401, and prompt information 453 is further displayed below the new group 410 for indicating that the first virtual object 402 and the target second virtual object 405 are currently in a voice chat. An entry 454 for more functions is further displayed in the prompt information 453. When a tap operation performed by the user 1 on the entry 454 for more functions is received, a message list 455 is displayed in the first part 401. The message list 455 includes a plurality of different types of messages, for example, a text message, a picture, an emoticon, and a file. An emoticon box 457 is displayed when a trigger operation performed by the user 1 on an emoticon control 456 displayed in the message list 455 is received, and a plurality of emoticons are displayed in the emoticon box 457. When a tap operation performed by the user 1 on an emoticon 458 displayed in the emoticon box 457 is received, the emoticon 458 selected by the user 1 is displayed above the first virtual object 402. In addition, the first virtual object 402 also performs an interactive action corresponding to the emoticon 458 (for example, the first virtual object 402 raises a hand). This can further enhance fun of interaction.

In the interaction data processing method provided in the embodiments of this disclosure, a real-time social status of a virtual object in a part of a region (namely, a first part) of a virtual space is displayed on a human-computer interaction interface in response to a virtual space login operation. Then the first part displayed on the human-computer interaction interface is switched to a second part in response to a virtual space browse operation. To be specific, a virtual object in another part (namely, a second part) of the virtual space may be displayed based on a browse operation. In this way, any virtual object in the virtual space can be easily found. This effectively improves efficiency of searching for a virtual object, provides reference for subsequently determining whether to perform interaction, and therefore also improves user experience.

The following describes exemplary application of the embodiments of this disclosure in a real application scenario.

In the related art, in an avatar-based interaction solution, the real physical world is usually simulated, and walking and interaction of an avatar on a virtual map are controlled through remote sensing (to be specific, a location of a user in the real world is mapped to a virtual world in a specific manner). For example, connection determining is performed based on a distance between avatars. A voice connection may be automatically established between two avatars in a case that a distance between the two avatars is less than a specific distance. To establish a stable connection, a specific region needs to be defined on a map.

However, online avatars cannot all be displayed by using a virtual map. Due to a space limitation on a physical map, the online avatars need to be divided into conceptual units (namely, logical units). For example, conceptual units such as a server, a map, and a room are distinguished. In this partitioning method, a friendship chain of a user is not sufficiently directly displayed. For example, after a friend of the user goes online, the two need to enter a same map to meet each other. In addition, efficiency of searching for people for social contact on a virtual map through remote sensing is low, because locations of people on the map are not distributed uniformly. Consequently, a few people can be found on a current map for social contact, and the user needs to switch to another map. In other words, efficiency of searching for an avatar is low. In addition, in the manner of establishing an interaction connection based on a distance, the interaction connection is unstable and likely to be interrupted, and is not good for carrying interaction content.

In view of this, the embodiments of this disclosure provide an interaction data processing method, to display all online avatars in one infinite space (which corresponds to the foregoing virtual space, and may be packaged as any infinite visual concept, for example, the universe, blank space, or earth). For example, in the infinite space, real-time relationship statuses of all the online avatars are displayed, including an idle state of an avatar and an interactive state in which a plurality of avatars gather together in real time for a chat, a meeting, or watching a live, or the like. In addition, in the infinite space in the embodiments of this disclosure, all online avatars and connections (corresponding to the foregoing group, to be specific, a combination formed through interaction between a plurality of avatars, which may be two or more people and is also referred to as a gathering or a gathering connection below) are separately displayed at appropriate distances (for example, distances between any adjacent avatars are equal, or are less than a specific threshold although the distances are unequal, to be specific, distribution density is greater than a distribution density threshold). A user may perform sliding and zooming by using gestures, to efficiently view any avatar in the infinite space. In addition, in the solution provided in the embodiments of this disclosure, a user can clearly establish and join a connection, and a connected state and connection content (to be specific, information generated when the user performs interaction by using an avatar, for example, chat text and voice, media shared by the user, and livestreaming organized by a platform) are highlighted. For example, the user may control an avatar of the user to interact with any avatar in an idle state in a current space, and may also join an existing connection in an interactive state. All avatars can directly perform interaction and obtain content in the current space, without entering a second-level page.

The interaction data processing method provided in the embodiments of this disclosure is described in detail below.

In some embodiments, all avatars in an online state and real-time interaction statuses of the avatars are displayed in an infinite space. FIG. 4A shows a scenario in which a user has just logged in to an infinite space. The user sees an avatar (the first virtual object 402 in FIG. 4A) of the user, surrounded by avatars of friends who are currently idle, and more online avatars are displayed on the left. In an initial state, an avatar closer to the user has a closer relationship with the user, for example, the avatar may be an avatar controlled by a friend with more interaction; and an avatar farther away from the user has a weaker relationship with the user, for example, the avatar may be an avatar controlled by a possible acquaintance or a stranger.

Still as shown in FIG. 4A, established connections, to be specific, real-time interaction between two or more avatars that gather together, are displayed in a region on the right. Types of connections may be a two-person chat, a multi-person chat, a meeting/lecture, watching a live, watching a ball game, watching a movie, and the like. A connection closer to the user has higher relevance to the user. For example, a connection that a friend joins may be closer to the user than a connection recommended to the user.

For example, the user may view a part of the infinite space by using a terminal device (for example, a mobile phone). In addition, the user may slide to view any corner of the space by using a gesture. In FIG. 4A, a mobile phone screen is used as an example. The user may view any corner of the space through sliding, and zooming may also be performed to improve navigation efficiency.

In some other embodiments, distribution of persons (namely, avatars) and groups (namely, connections) in the infinite space is shown in FIG. 5. A starting point at which a user enters the infinite space may be set in a friend zone. With the starting point of the user as a center, a person and a group closer to the center has higher relevance to the user, and relevance decreases as a distance increases. To be specific, the user can preferentially browse friends and interest-related connections and then strangers and recommended content.

In the embodiments of this disclosure, to help the user clearly distinguish between two objectives of searching for a person and searching for a group, a region is divided into a leftward person search and a rightward group search in FIG. 5. Certainly, the distribution of persons and groups may alternatively be changed to other distribution, for example, up/down distribution, circular distribution, hybrid distribution, or relevance ranking adjustment. In addition, in FIG. 5, the starting point at which the user enters the infinite space is set in the friend zone. Certainly, the starting point may alternatively be set in another zone. This is not specifically limited in the embodiments of this disclosure.

In some embodiments, the user may actively establish a connection to another person.

For example, the user may directly connect to an avatar in an idle state (to be specific, the avatar is currently not in another connection) in the infinite space. As shown in FIG. 4D, a user A taps an avatar in an idle state (namely, the target second virtual object 405 in FIG. 4D, for example, an avatar of a user B), and a screen focuses on an operation performed by the avatar. After the user A selects a chat, an avatar of the user A (namely, the first virtual object 402 in FIG. 4D) disappears from an original location, appears in front of the avatar of the user B, and establishes a live chat connection to the avatar of the user B. After the connection is successfully established, the screen is restored to a default zoom view. Certainly, the user may also subsequently modify the zoom of the screen by using a gesture. In addition, a location of the chat connection is slowly moved from an original individual display zone to a junction between a person zone and a group zone. For example, locations of two avatars corresponding to the chat connection on a current interface may be kept unchanged, and other avatars move.

In the embodiments of this disclosure, a voice chat is established as a connection. However, an actual connection is not limited to voice, but may alternatively be a plurality of types of messages such as a text message, an emoticon, a picture, and a file. Communication may also be performed in the connection. As shown in FIG. 4Q, more types of messages may be transmitted. For example, in a case that an emoticon is transmitted, the avatar of the user may make a corresponding interactive animation.

In some other embodiments, another person may alternatively establish a connection to the user.

For example, another person may alternatively automatically establish a connection to the user in a case that the avatar of the user is in an idle state. As shown in FIG. 4E, the avatar of the user B (namely, the first virtual object 402 in FIG. 4E) is currently in a viewfinder frame. In a case that the user A selects the avatar of the user B and initiates a live chat, the avatar of the user A (namely, the target second virtual object 405 in FIG. 4E) appears in front of the avatar of the user B.

In addition, as shown in FIG. 4F, the user B slides the avatar of the user B (namely, the first virtual object 402 in FIG. 4F) out of a range of the viewfinder frame and browses an avatar of another user. During this period, in a case that the user A initiates a request for establishing a live chat with the user B, the avatar of the user A (namely, the target second virtual object 405 in FIG. 4F) and the avatar of the user B appear on a current screen, to notify the user B that a live chat connection has been established to the user B.

In some embodiments, as shown in FIG. 4G, a user C slides a viewfinder frame to look at the avatar of the user B (namely, the any second virtual object 405 in FIG. 4G), and the avatar of the user A and the avatar of the user B are first connected. In this case, effect seen by the user C depends on a friendship between the user C and the user A and a friendship between the user C and the user B. In a case that the user C is a friend of either or both of the user A and the user B, the user C may see that the avatar of the user A has established a connection to the avatar of the user B (namely, the another second virtual object 413 in FIG. 4G). In a case that the user C is a friend of none of the user A and the user B, the user C may see that the avatar of the user B disappears from the viewfinder frame.

In some embodiments, the user may alternatively join an existing multi-person connection.

For example, the user may see a public multi-person gathering connection and may choose to join a chat. As shown in FIG. 4I, the user selects a multi-person chat (namely, the first group 416 in FIG. 4I) without a presenter. In this case, the avatar of the user (namely, the first virtual object 402 in FIG. 4I) may be controlled to move to a location of a connection of the multi-person chat. After joining the group chat, the user may perform real-time speech and obtain chat information in the group chat.

For example, for a semi-public multi-person gathering connection, the user needs to meet a condition specified by a creator to join the gathering, for example, requests to join the gathering or enters a password. As shown in FIG. 4J, the user sees a semi-public gathering, for example, a meeting in a presenter mode, and the user successfully joins the gathering by entering a correct password. The avatar of the user becomes an audience in a muted mode by default, and the user can hear voice of the presenter and see projected content.

In some other embodiments, the user may alternatively join a connection recommended by a server.

For example, in addition to a user-initiated multi-person gathering, the server may also organize gatherings with different types of themes, for example, cloud disco, watching a concert, watching a movie, and watching a ball game, to attract the user to join the gatherings for interaction. As shown in FIG. 4M, connections with different content may be recommended to the user. In a case that a friend of the user joins a connection, the connection is preferentially recommended to the user (for example, compared with another connection, the connection is closer to the avatar of the user, or is displayed in a more prominent manner), and an avatar of the friend (for example, the target member 432 in FIG. 4M) is highlighted among participants. After the user joins the connection, the avatar of the user (namely, the first virtual object 402 in FIG. 4M) appears near a location of the avatar of the friend.

In some embodiments, the user may alternatively create a multi-person connection.

For example, the user may create a multi-person connection and may modify a chat mode for a group chat. As shown in FIG. 4P, the user may write a theme, may set a type to a round table mode or a presenter mode, and may edit a visibility range, a join manner, and the like for the group chat.

In some other embodiments, a creator may alternatively directly add an avatar in an idle state to a connection, and may send an invitation to a non-idle friend. In the embodiments of this disclosure, an avatar can join only one connection at a time. In a case that an avatar in a connected state is to join a new connection, a current connection needs to be interrupted first. As shown in FIG. 4N, after accepting an invitation, a friend leaves a current connection and joins a new connection.

In some embodiments, in a case that the user in a connected state actively taps another connection, the user also needs to interrupt a current connection before joining a new connection. As shown in FIG. 4O, in a case that the user already has a connection, the user is asked by using a pop-up window. After the user chooses to join a new connection, content and sound of a current connection are disconnected, and the avatar of the user (namely, the first virtual object 402 in FIG. 4O) leaves the current connection, appears in the new connection, and receives sound and content of the new connection.

In some embodiments, the user may alternatively send a private message in a multi-person connection.

For example, as shown in FIG. 4K, in the multi-person connection, the user may send private chat information to an individual in the gathering, and sent and received private messages are visible only to a sender and a recipient and are invisible to other persons. In addition, as shown in FIG. 4L, a recipient may receive a private message notification and tap the private message notification to view and reply to a private message, and after the private message is closed, may also tap a private message entry for an avatar to view the private message in this connection again.

In addition to sending a private message to an individual in the gathering in the multi-person connection, the user may also send a private message to an avatar in an idle state without establishing a connection, or may send a private message to an avatar that has joined another connection. This is not specifically limited in the embodiments of this disclosure.

In some other embodiments, as shown in FIG. 4H, the user in the connected state slides a screen. In a case that a current connection slides out of the screen, a floating prompt control may appear at a fixed location on a subsequently displayed screen to notify the user that a call connection is still ongoing. The current connection (namely, the new group 410 in FIG. 4H) disappears from a location beyond the infinite space and appears on the currently displayed screen, and the floating prompt control also disappears.

In the foregoing navigation manner for an existing connection, the user slides the current connection out of the screen, the floating control is used to indicate an ongoing connection, and the control is tapped to move the connection back to the current screen. Alternatively, another navigation manner may be used. For example, a floating prompt control is displayed on the screen when the current connection slides out of the screen, and when the control is tapped, the screen displayed before the connection slides out is restored in a view; or a prompt control is displayed on the screen when the current connection slides out of the screen, and the current connection is floating on the screen when the control is taped. Alternatively, the current connection may be kept on the screen, and only other content slides out when the user performs sliding. This is not specifically limited in the embodiments of this disclosure.

In some embodiments, the solution provided in the embodiments of this disclosure may be developed by using an unreal engine. In addition, to adapt to a scenario of an infinite space, no dedicated server is used for communication with the background; instead, a solution of establishing a communication link is used to meet a requirement of the infinite space. The solution mainly includes two parts: a client and a background server. For the client, logic may be developed by using a scripting language (for example, Lua), and internal components are used to expand capabilities.

Figure 7:
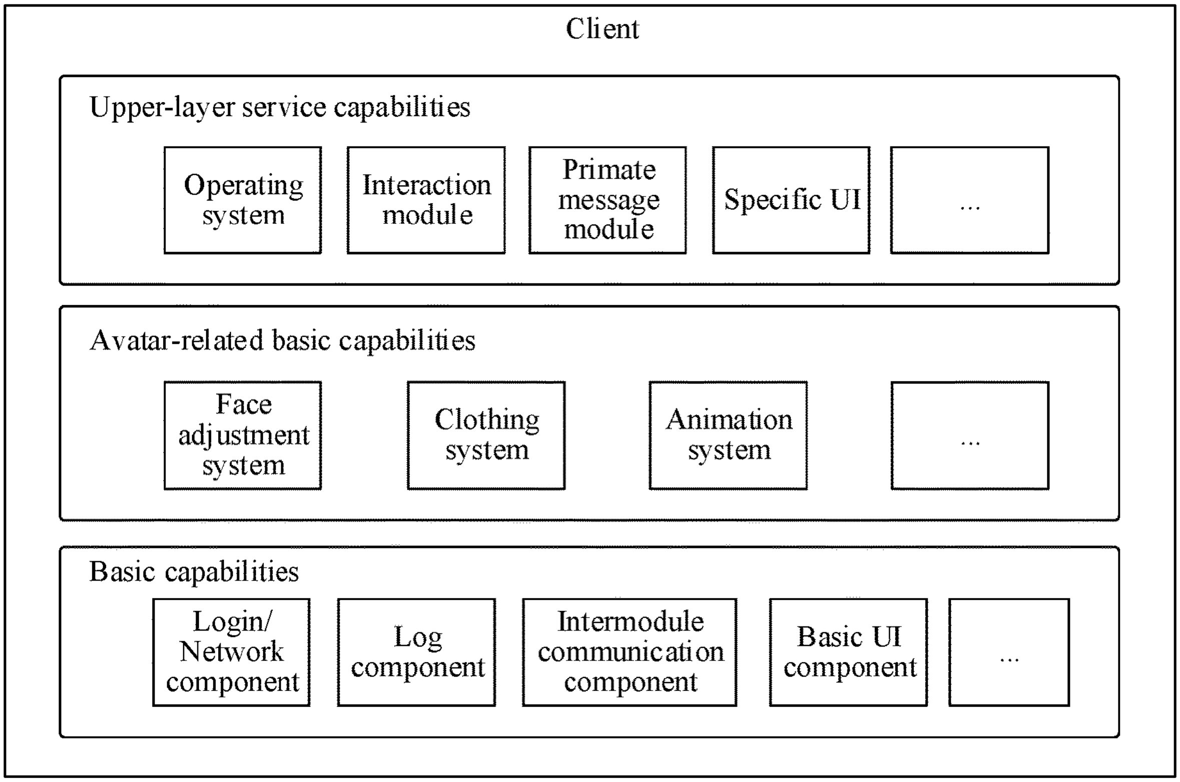
FIG. 7 is a schematic architectural diagram of a client according to an embodiment of this disclosure.

For example, FIG. 7 is a schematic architectural diagram of a client according to an embodiment of this disclosure. As shown in FIG. 7, the client mainly includes three layers: basic capabilities, avatar-related basic capabilities, and upper-layer service capabilities. Details are described below.

(1) Basic Capabilities

Basic capabilities mainly provide login/network communication, log printing and output, communication between different modules, and a series of reusable basic user interfaces (UIs). A login/network component is configured to support user registration and login, and establish a persistent link to a background server for status synchronization after login. Transmitted data may be encoded by using protobuf (an internal mixed-language data standard of Google, which serializes structured data into a language-independent, platform-independent, and extensible serialized data format for the fields of communication protocols, data storage, and the like) to compress a data size. An upper layer transmits command words and data to the network component, and the network component forwards the command words and the data to the backend through a channel established after login. In addition, an upper-layer service learns of backend data changes by using registration command words.

A log component is mainly configured to provide a unified log printing capability, support log printing at different levels, provide different maintenance logic for logs at different levels, and support output of warning and error logs to files.

An intermodule communication component is configured to support communication between different systems. The intermodule communication component is introduced for decoupling and avoiding direct references between different modules. All modules may communicate with each other through this component.

A basic UI component is mainly configured to provide some basic UIs of uniform styles.

(2) Avatar-related Basic Capabilities

The avatar-related basic capabilities mainly provide capabilities for building a complete avatar, for example, including face adjustment, clothing, and animations. A face adjustment system enables a user to define a face image of an avatar of the user, and is configured to convert data into a face image, or convert a face image into data and save the data to the background server. A clothing system enables a user to freely match clothing of an avatar of the user, and decodes clothing data into specific clothing information. An animation system enables an avatar to make different actions.

(3) Upper-layer Service Capabilities

The upper-layer service capabilities mainly provide specific service scenario logic and operation logic, for example, operations performed by avatars, interaction between different avatars, and private messages between users. An operating system is a system for a user for processing operation logic of an application, including response to and distribution of movement, zooming, and taping logic and the like of a camera. An interaction module is a module for processing interaction logic triggered after a user taps an avatar of another friend. A private message module is a module for specific logic processing after a message transmitted between users is forwarded by the background server. A specific UI is an upper-layer editor control (for example, UMG) for each specific scene.

The background server is further described below.

In some embodiments, an existing internal access layer and an existing login authentication module may be used on the background server. An overall architecture of the background server is shown in FIG. 8.

Figure 8:
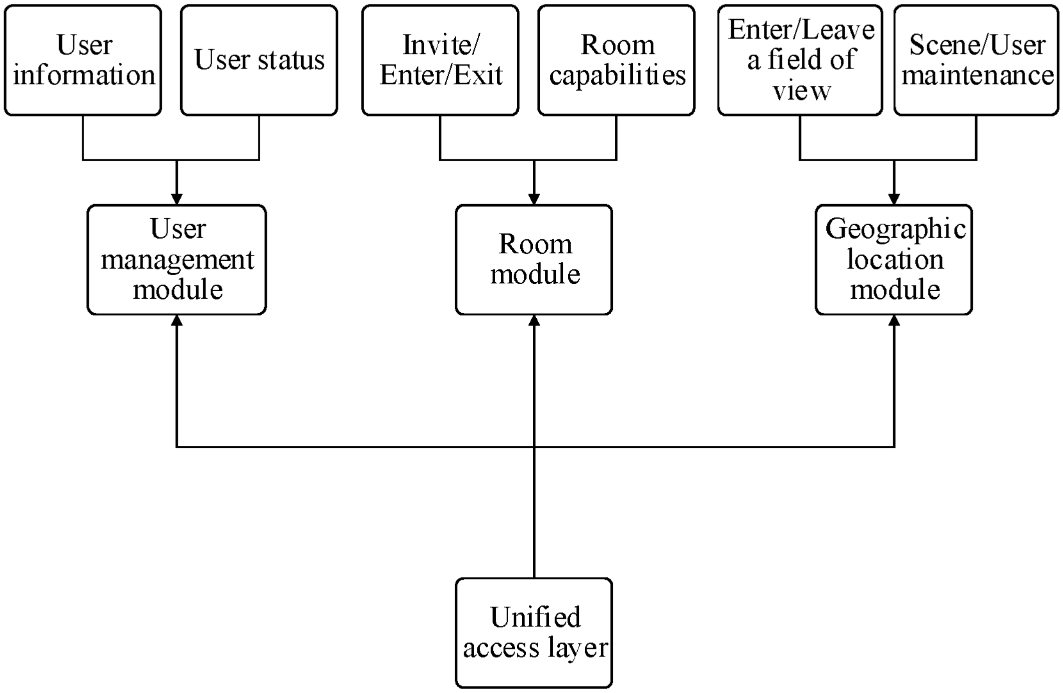
FIG. 8 is a schematic architectural diagram of a background server according to an embodiment of this disclosure.

As shown in FIG. 8, after a client is connected, a data packet is first forwarded through a unified access layer. The unified access layer identifies a specific command word and forwards the data packet to a specific service. The service transmits reply packets or actively pushes packets to different users through the unified access layer.

For example, a user management module is mainly configured to store various types of user information, for example, face data, clothing data, and a nickname of an avatar, for the client to display a specific image. A user status maintains a tag indicating whether a user is in an online state or a room state. The client queries for the user information when rendering an avatar of a user, and the background server verifies a user status when the user enters a room. In a case that the user status changes, the change is pushed to surrounding users to notify the surrounding users.

For example, a room module is mainly configured to provide room entry/exit capabilities and also provide in-room capabilities such as karaoke or watching together.

For example, a geographic location module is an important module in the system. To enable a user to ignore a concept of room, a large number of users need to be connected to one service. A user may find another user around the user through a geographic location system, and after a status of the user is modified, may also actively push the modification to a surrounding user. In this way, effect of an infinite space can be achieved through a small range of data maintenance.

In the interaction data processing method provided in the embodiments of this disclosure, a user is guided to establish and join a connection. This is more interesting and real-time compared with a manner of combining an instant messaging (IM) tool list with a chat window in the related art, and therefore facilities social contact for users. In addition, the infinite space in the embodiments of this disclosure is not limited by a location or a region, and persons and content can be arranged compared more flexibly compared with what on a virtual map. This improves search efficiency for a user.

The following further describes an exemplary structure of an interaction data processing apparatus 555 provided in the embodiments of this disclosure when the apparatus is implemented as software modules. In some embodiments, as shown in FIG. 2, software modules of the interaction data processing apparatus 555 that are stored in a memory 550 may include a display module 5551 and a switching module 5552.

The display module 5551 is configured to display a module is configured to displaying a first part of a virtual space on a first human-computer interaction interface in response to a virtual space login operation, the virtual space including a plurality of groups and a plurality of virtual objects in a solitary state. The switching module 5552 is configured to switch the first part displayed on the first human-computer interaction interface to a second part of the virtual space in response to a virtual space browse operation, the second part being at least partially different from the first part.

In some embodiments, the plurality of virtual objects include a first virtual object and at least one second virtual object, the first virtual object is a virtual object able to be controlled on the first human-computer interaction interface, and the second virtual object is any one of the plurality of virtual objects other than the first virtual object; and the display module 5551 is further configured to display the first virtual object on the first human-computer interaction interface, and display at least one of the second virtual object and the group.

In some embodiments, the display module 5551 is further configured to: display the first virtual object in a first object region of the virtual space, the first object region including a second virtual object that has a social relationship with the first virtual object; display a second object region and a third object region in a near-to-far order in a first direction of the first object region, the second object region including a second virtual object recommended for the first virtual object to interact with, and the third object region including a second virtual object that does not have a social relationship with the first virtual object; and display a first group region, a second group region, and a third group region in a near-to-far order in a second direction of the first object region, the first group region including a group that a second virtual object having a social relationship with the first virtual object joins, the second group region including a group recommended for the first virtual object to join, and the third group region including a group that the first virtual object does not join.

In some embodiments, a distance between the first virtual object and the second virtual object is negatively correlated with the following parameter: a similarity between the first virtual object and the second virtual object, the similarity being determined based on at least one of the following information of the first virtual object and the second virtual object: a social relationship, an interest/preference, and social contact frequency; and a distance between the first virtual object and the group is negatively correlated with the following parameter: a similarity between the first virtual object and the group, the similarity being determined based on at least one of the following information of the first virtual object and the group: a social relationship, an interest/preference, and social contact frequency.

In some embodiments, in the virtual space, distribution density of the plurality of groups and the plurality of virtual objects is greater than a distribution density threshold, and a distribution spacing is less than a distribution spacing threshold.

In some embodiments, in a case that the virtual space browse operation is a slide operation on the first human-computer interaction interface, the switching module 5552 is further configured to switch the first part displayed on the first human-computer interaction interface to the second part of the virtual space in response to the slide operation based on a sliding direction and a sliding distance of the slide operation, a distribution direction of the second part relative to the first part being consistent with the sliding direction, and a distance between a center of the second part and a center of the first part being consistent with the sliding distance.

In some embodiments, the display module 5551 is further configured to display a third part of the virtual space in response to a zoom operation for the first part, the third part being determined by zooming in or zooming out the first part based on a zoom ratio corresponding to the zoom operation.

In some embodiments, the plurality of virtual objects include a first virtual object and at least one second virtual object, the first virtual object is a virtual object able to be controlled on the first human-computer interaction interface, and the second virtual object is any one of the plurality of virtual objects other than the first virtual object; the display module 5551 is further configured to display a target second virtual object in a selected state in response to an object selection operation in the first part or the second part, the target second virtual object being a second virtual object selected by the object selection operation; and the interaction data processing apparatus 555 further includes a moving module 5553, configured to move the first virtual object to a location of the target second virtual object in response to an interaction request for the target second virtual object, so that the first virtual object and the target second virtual object constitute a new group, the new group being different from the plurality of groups.

In some embodiments, the first virtual object and the target second virtual object each are located in a virtual channel; and the display module 5551 is further configured to display disappearance of the first virtual object from a virtual channel in which the first virtual object is currently located, and appearance of the first virtual object in a virtual channel in which the target second virtual object is located, so that the first virtual object and the target second virtual object constitute a new group.

In some embodiments, the plurality of virtual objects and the plurality of groups are distributed in different regions in the virtual space; and after moving the first virtual object to the location of the target second virtual object, so that the first virtual object and the target second virtual object constitute a new group, the moving module 5553 is further configured to: move the new group to a junction between a region in which the plurality of virtual objects are distributed and a region in which the plurality of groups are distributed, to display the new group at the junction; or move the new group to a region in which the plurality of groups are distributed, to display the new group in the region in which the plurality of groups are distributed.

In some embodiments, the display module 5551 is further configured to display the target second virtual object in the selected state in a zoom-in mode; and the interaction data processing apparatus 555 further includes a cancellation module 5554, configured to cancel the zoom-in mode of the target second virtual object after the new group is constituted.

In some embodiments, in a case that the object selection operation is performed on the first part, the first part includes the new group, and the second part does not include the new group, after switching the first part displayed on the first human-computer interaction interface to the second part of the virtual space, the display module 5551 is further configured to display a prompt control in the second part, the prompt control being used for indicating that the first virtual object and the target second virtual object are still in an interactive state; the moving module 5553 is further configured to move the new group from the first part to the second part in response to a trigger operation on the prompt control; and the display module 5551 is further configured to cancel the display of the prompt control in the second part.

In some embodiments, in a case that the object selection operation is performed on the first part, the first part includes the new group, and the second part does not include the new group, after switching the first part displayed on the first human-computer interaction interface to the second part of the virtual space, the display module 5551 is further configured to display a prompt control in the second part, the prompt control being used for indicating that the first virtual object and the target second virtual object are still in an interactive state; the switching module 5552 is further configured to switch the second part displayed on the first human-computer interaction interface to the first part in response to a trigger operation on the prompt control; and the display module 5551 is further configured to cancel the display of the prompt control in the second part.

In some embodiments, in a case that the object selection operation is performed on the first part, the first part includes the new group, and the second part does not include the new group, the switching module 5552 is further configured to: in response to the virtual space browse operation, keep a location of the new group on the first human-computer interaction interface unchanged, and switch a virtual object and a group in the first part other than the new group to a virtual object and a group that are included in the second part of the virtual space.

In some embodiments, the plurality of virtual objects include a first virtual object and at least one second virtual object, the first virtual object is a virtual object able to be controlled on the first human-computer interaction interface, and the second virtual object is any one of the plurality of virtual objects other than the first virtual object; and the moving module 5553 is further configured to move a target second virtual object to a location of the first virtual object in response to an interaction request of the target second virtual object for the first virtual object, so that the first virtual object and the target second virtual object constitute a new group different from the plurality of groups, the target second virtual object being a second virtual object that needs to interact with the first virtual object, the interaction request being transmitted by a terminal device running a second human-computer interaction interface, and the second human-computer interaction interface being used for controlling the target second virtual object.

In some embodiments, the plurality of virtual objects include a first virtual object and at least one second virtual object, the first virtual object is a virtual object able to be controlled on the first human-computer interaction interface, and the second virtual object is any one of the plurality of virtual objects other than the first virtual object; and in a case that the first part includes the first virtual object and the second part does not include the first virtual object, after switching the first part displayed on the first human-computer interaction interface to the second part of the virtual space, the moving module 5553 is further configured to move the first virtual object and a target second virtual object to the second part in response to an interaction request of the target second virtual object for the first virtual object, so that the first virtual object and the target second virtual object constitute a new group different from the plurality of groups, the target second virtual object being a second virtual object that needs to interact with the first virtual object, the interaction request being transmitted by a terminal device running a second human-computer interaction interface, and the second human-computer interaction interface being used for controlling the target second virtual object.

In some embodiments, the plurality of virtual objects include a first virtual object and at least one second virtual object, the first virtual object is a virtual object able to be controlled on the first human-computer interaction interface, and the second virtual object is any one of the plurality of virtual objects other than the first virtual object; and in a case that the first part or the second part includes the first virtual object and any second virtual object is in a field of view of the first virtual object, the moving module 5553 is further configured to: in response to that any second virtual object receives an interaction request transmitted by another second virtual object and the first virtual object has a social relationship with at least one of the any second virtual object and the another second virtual object, move the another second virtual object to a location of the any second virtual object to constitute a new group different from the plurality of groups; or in response to that any second virtual object receives an interaction request transmitted by another second virtual object and the first virtual object does not have a social relationship with either of the any second virtual object and the another second virtual object, move the any second virtual object out of a field of view of the first virtual object.

In some embodiments, the plurality of virtual objects include a first virtual object, and the first virtual object is a virtual object able to be controlled on the first human-computer interaction interface; the display module 5551 is further configured to display a first group in a selected state in response to a group selection operation in the first part or the second part, the first group being a group selected by the group selection operation; and the moving module 5553 is further configured to move the first virtual object to the first group in response to a group-join trigger operation for the first group, so that the first virtual object becomes a new member of the first group.

In some embodiments, after moving the first virtual object to the first group so that the first virtual object becomes a new member of the first group, the display module 5551 is further configured to: display an entry for transmitting a message to a target second virtual object in response to an object selection operation for the first group, the target second virtual object being a second virtual object selected by the object selection operation from the first group; and display a message editing control in response to a trigger operation for the entry, the message editing control being used for editing a first message, and the first message being visible only to the first virtual object and the target second virtual object; the interaction data processing apparatus 555 further includes a transmitting module 5555, configured to transmit the first message to the target second virtual object in response to a transmission trigger operation; and the display module 5551 is further configured to display a second message that comes from the target second virtual object, the second message being visible only to the first virtual object and the target second virtual object.

In some embodiments, the interaction data processing apparatus 555 further includes a proceeding module 5556, configured to: in a case that the first group is a private group and before the first virtual object is moved to the first group, in response to that the first virtual object meets a specified group-join condition, proceed to processing of moving the first virtual object to the first group, the group-join condition including at least one of the following: verification on a password succeeds, and verification on a group-join request succeeds.

In some embodiments, the display module 5551 is further configured to highlight a target member in the first group, a display parameter of the target member being different from a display parameter of another member, the target member being a virtual object in the first group that has a social relationship with the first virtual object, and the another member being a virtual object in the first group other than the target member; and the moving module 5553 is further configured to move the first virtual object to a location adjacent to the target member after the first virtual object becomes a new member of the first group.

In some embodiments, the display module 5551 is further configured to display prompt information in response to that an invitation request for joining a second group is received or a selection operation performed on a second group in the plurality of groups is received, the prompt information being used for prompting the first virtual object to exit the first group and join the second group; and the moving module 5553 is further configured to move the first virtual object from the first group to the second group in response to a confirmation operation performed on the prompt information, so that the first virtual object exits the first group and becomes a new member of the second group.

In some embodiments, the plurality of virtual objects include a first virtual object and at least one second virtual object, the first virtual object is a virtual object able to be controlled on the first human-computer interaction interface, and the second virtual object is any one of the plurality of virtual objects other than the first virtual object; and the display module 5551 is further configured to: display a group creation control on the first human-computer interaction interface; in response to a trigger operation for the group creation control, display a group chat mode setting control and at least one second virtual object that has a social relationship with the first virtual object, a selection control being displayed on each second virtual object for inviting the second virtual object to join a new group different from the plurality of groups; and display at least one of the following controls in response to a trigger operation for the group chat mode setting control: a theme control for setting a theme of the new group; a type control for setting a type of the new group; a visibility range control for setting a visibility range of the new group; and a join manner control for setting a manner of joining the new group.

In some embodiments, the plurality of virtual objects include a first virtual object, and the first virtual object is a virtual object able to be controlled on the first human-computer interaction interface; and the display module 5551 is further configured to: display a setting entry on the first human-computer interaction interface; and display at least one of the following controls in response to a trigger operation for the setting entry: a face adjustment control for adjusting a face image of the first virtual object; a clothing control for adjusting clothing of the first virtual object; and an action control for setting an action of the first virtual object.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The descriptions of the apparatus in this embodiment of this disclosure are similar to the descriptions of the foregoing method embodiments, and the apparatus has beneficial effect similar to that of the method embodiments. Therefore, details are not described again. For technical details not disclosed in the interaction data processing apparatus provided in this embodiment of this disclosure, refer to the descriptions of any one of FIG. 3, FIG. 6A, or FIG. 6B for understanding.

An embodiment of this disclosure provides a computer program product. The computer program product includes a computer program or executable instructions. The computer program or the executable instructions are stored in a computer-readable storage medium. A processor of an electronic device reads the computer program or the executable instructions from the computer-readable storage medium, and the processor executes the computer program or the executable instructions, so that the electronic device performs the interaction data processing method in the embodiments of this disclosure.

An embodiment of this disclosure provides a computer-readable storage medium, such as a non-transitory computer-readable storage medium, storing a computer program or executable instructions. When the computer program or the executable instructions are executed by a processor, the processor is enabled to perform the interaction data processing method provided in the embodiments of this disclosure, for example, the interaction data processing method shown in FIG. 3, FIG. 6A, or FIG. 6B.

In some embodiments, the computer-readable storage medium may be a memory such as an FRAM, a ROM, a PROM, an EPROM, an EEPROM, a flash memory, a magnetic surface memory, a compact disc, or a CD-ROM; or may be various devices including one of or any combination of the foregoing memories.

In some embodiments, the executable instructions may be written in a form of a program, software, a software module, a script, or code based on a programming language in any form (including a compiled or interpretive language, or a declarative or procedural language), and may be deployed in any form, including being deployed as a standalone program, or being deployed as a module, a component, a subroutine, or another unit suitable for use in a computing environment.

In an example, the executable instructions may be deployed on one electronic device for execution, or may be executed on a plurality of electronic devices at one location, or may be executed on a plurality of electronic devices that are distributed at a plurality of locations and that are interconnected through a communication network.

The foregoing descriptions are merely embodiments of this disclosure and are not intended to limit the protection scope of this disclosure. Any modification, equivalent replacement, or improvement made without departing from the spirit and scope of this disclosure shall fall within the protection scope of this disclosure.

What is claimed is:

1. An interaction data processing method, the method comprising:

displaying a first part of a virtual space on a first user interface, the virtual space including a plurality of virtual objects, the plurality of virtual objects being displayed in the virtual space based on respective social interaction states of the plurality of virtual objects, a first subset of the plurality of virtual objects in a grouped social interaction state is displayed as a group occupying a shared spatial region of the virtual space and a second subset of the plurality of virtual objects in an individual social interaction state is displayed individually, each of the virtual objects in the second subset occupying a respective different spatial region of the virtual space;

receiving a virtual space browse operation to navigate to a second part of the virtual space; and changing the display of the first part of the virtual space on the first user interface to the second part of the virtual space based on the virtual space browse operation, the first part of the virtual space and the second part of the virtual space being spatially different parts of the virtual space.

2. The method according to claim 1, wherein the plurality of virtual objects includes a first virtual object and a second virtual object, the first virtual object being controlled by a first user via the first user interface, and the second virtual object being controlled by a second user; and the displaying the first part of the virtual space includes displaying the first virtual object and the second virtual object on the first user interface.

3. The method according to claim 2, wherein the displaying the first virtual object and the second virtual object comprises:

displaying the first virtual object in a first object spatial region of the virtual space, the first object spatial region including the second virtual object that has a social relationship with the first virtual object;

displaying a second object spatial region and a third object spatial region, the second object spatial region including a third virtual object recommended to the first virtual object to interact with, and the third object spatial region including a fourth virtual object that does not have the social relationship with the first virtual object, a distance between the third object spatial region and the first object spatial region being greater than a distance between the second object spatial region and the first object spatial region; and displaying a first group spatial region, a second group spatial region, and a third group spatial region, the first group spatial region including a group that the second virtual object having the social relationship with the first virtual object joins, the second group spatial region including a group recommended to the first virtual object to join, and the third group spatial region including a group that the first virtual object does not join, a distance between the third group spatial region and the first group spatial region being greater than a distance between the second group spatial region and the first group spatial region.

4. The method according to claim 2, wherein a distance between the first virtual object and the second virtual object is negatively correlated with a similarity between the first virtual object and the second virtual object, the similarity being determined based on a social relationship between the first virtual object and the second virtual object; and a distance between the first virtual object and the group of the first subset of the plurality of virtual objects is negatively correlated with a similarity between attributes of the first virtual object and the group.

5. The method according to claim 1, wherein in the virtual space, a distribution density of the plurality of virtual objects is greater than a distribution density threshold, and a distribution spacing is less than a distribution spacing threshold.

6. The method according to claim 1, wherein the virtual space browse operation is a slide operation on the first user interface, and the changing the display includes changing the display of the first part of the virtual space on the first user interface to the second part of the virtual space based on a sliding direction and a sliding distance of the slide operation.

7. The method according to claim 1, further comprising:

displaying a third part of the virtual space based on a zoom operation that is performed on the first part of the virtual space, the third part being determined by zooming in or zooming out of the first part based on a zoom ratio corresponding to the zoom operation.

8. The method according to claim 1, wherein the plurality of virtual objects includes a first virtual object and a second virtual object, the first virtual object being controlled by a first user via the first user interface, and the second virtual object being controlled by a second user; and the method further comprises:

displaying the second virtual object in a selected state based on an object selection operation being performed on the second virtual object, and moving the first virtual object to a location of the second virtual object based on an interaction request to interact with the second virtual object, the first virtual object and the second virtual object forming a new group in the virtual space.

9. The method according to claim 8, wherein the first virtual object is located in a first virtual channel and the second virtual object is located in a second virtual channel; and the moving the first virtual object comprises:

removing the first virtual object from the first virtual channel, and adding the first virtual object in the second virtual channel, the first virtual object and the second virtual object forming the new group.

10. The method according to claim 8, wherein the plurality of virtual objects are distributed in different regions in the virtual space; and the method further includes moving the new group to one of (i) a junction between a spatial region in which the second subset of the plurality of virtual objects in the individual social interaction state are distributed and a spatial region in which the first subset of the plurality of virtual objects in the grouped social interaction state are distributed, and (ii) a spatial region in which the first subset of the plurality of virtual objects in the grouped social interaction state are distributed.

11. The method according to claim 8, wherein when the object selection operation is performed on the first part, the first part includes the new group, and the second part does not include the new group, the method further comprises:

displaying a prompt control element in the second part, the prompt control element indicating that the first virtual object and the second virtual object are in an interactive state; and based on a trigger operation on the prompt control element, moving the new group from the first part to the second part, and canceling the display of the prompt control element in the second part, or switching the second part displayed on the first user interface to the first part, and canceling the display of the prompt control element in the second part.

12. The method according to claim 8, wherein when the object selection operation is performed on the first part, the first part includes the new group, and the second part does not include the new group, the changing the display of the first part includes maintaining a location of the new group on the first user interface.

13. The method according to claim 1, wherein the plurality of virtual objects includes a first virtual object and a second virtual object, the first virtual object being controlled by a first user via the first user interface, and the second virtual object being controlled by a second user; and the method further includes moving the second virtual object to a location of the first virtual object based on an interaction request from the second user of the second virtual object to interact with the first virtual object, the first virtual object and the second virtual object forming a new group in the virtual space.

14. The method according to claim 1, wherein the plurality of virtual objects includes a first virtual object and a second virtual object, the first virtual object being controlled by a first user via the first user interface, and the second virtual object being controlled by a second user; and when the first part includes the first virtual object and the second part does not include the first virtual object, the method further comprises:

moving the first virtual object and the second virtual object to the second part based on an interaction request from the second user of the second virtual object to interact with the first virtual object, the first virtual object and the second virtual object forming a new group in the virtual space.

15. The method according to claim 1, wherein the plurality of virtual objects includes a first virtual object and a second virtual object, the first virtual object is controlled via the first user interface, and the second virtual object is controlled by a second user; and when the first part or the second part includes the first virtual object and a third virtual object of the plurality of virtual objects is in a field of view of the first virtual object, the method further comprises:

based on the third virtual object receiving an interaction request from a fourth virtual object of the plurality of virtual objects and the first virtual object having a social relationship with at least one of the third virtual object or the fourth virtual object, moving the fourth virtual object to a location of the third virtual object, the third virtual object and the fourth virtual object forming a new group in the virtual space, and based on the third virtual object receiving the interaction request from the fourth virtual object and the first virtual object not having the social relationship with either of the third virtual object and the fourth virtual object, moving the third virtual object out of the field of view of the first virtual object.

16. The method according to claim 1, wherein the plurality of virtual objects includes a first virtual object, and the first virtual object is controlled by a first user via the first user interface; and the method further comprises:

displaying the group of the first subset of the plurality of virtual objects in a selected state based on a group selection operation being performed on the group of the first subset of the plurality of virtual objects; and moving the first virtual object to the group of the first subset of the plurality of virtual objects based on a group-join trigger operation to join the group of the first subset of the plurality of virtual objects.

17. The method according to claim 16, further comprising:

displaying an entry element for transmitting a message to a second virtual object of the plurality of virtual objects based on an object selection operation being performed on the second virtual object in the group of the first subset of the plurality of virtual objects;

displaying a message editing control element based on a trigger operation being performed on the entry element, the message editing control element being configured to edit a first message, and the first message being visible only to the first virtual object and the second virtual object;

transmitting the first message to the second virtual object based on a transmission trigger operation; and displaying a second message from the second virtual object, the second message being visible only to the first virtual object and the second virtual object.

18. The method according to claim 16, wherein when the group of the first subset of the plurality of virtual objects is a private group, the moving the first virtual object to the group of the first subset of the plurality of virtual objects includes moving the first virtual object to the group of the first subset of the plurality of virtual objects based on the first virtual object meeting a specified group-join condition.

19. An interaction data processing apparatus, comprising:

processing circuitry configured to:

display a first part of a virtual space on a first user interface, the virtual space including a plurality of virtual objects, the plurality of virtual objects being displayed in the virtual space based on respective social interaction states of the plurality of virtual objects, a first subset of the plurality of virtual objects in a grouped social interaction state is displayed as a group occupying a shared spatial region of the virtual space and a second subset of the plurality of virtual objects in an individual social interaction state is displayed individually, each of the virtual objects in the second subset occupying a respective different spatial region of the virtual space;

receive a virtual space browse operation to navigate to a second part of the virtual space; and change the display of the first part of the virtual space on the first user interface to the second part of the virtual space based on the virtual space browse operation, the first part of the virtual space and the second part of the virtual space being spatially different parts of the virtual space.

20. A non-transitory computer-readable storage medium storing instructions which when executed by a processor cause the processor to perform:

displaying a first part of a virtual space on a first user interface, the virtual space including a plurality of virtual objects, the plurality of virtual objects being displayed in the virtual space based on respective social interaction states of the plurality of virtual objects, a first subset of the plurality of virtual objects in a grouped social interaction state is displayed as a group occupying a shared spatial region of the virtual space and a second subset of the plurality of virtual objects in an individual social interaction state is displayed individually, each of the virtual objects in the second subset occupying a respective different spatial region of the virtual space;

receiving a virtual space browse operation to navigate to a second part of the virtual space; and changing the display of the first part of the virtual space on the first user interface to the second part of the virtual space based on the virtual space browse operation, the first part of the virtual space and the second part of the virtual space being spatially different parts of the virtual space.

* * * * *